June 4, 1963  J. B. WAGNER ET AL  3,091,933
CONTROL SYSTEM
Filed Dec. 7, 1960  13 Sheets-Sheet 1
FIG. I
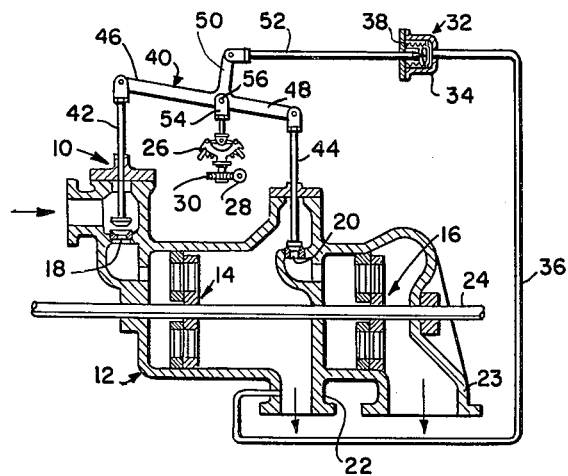
FIG. 2
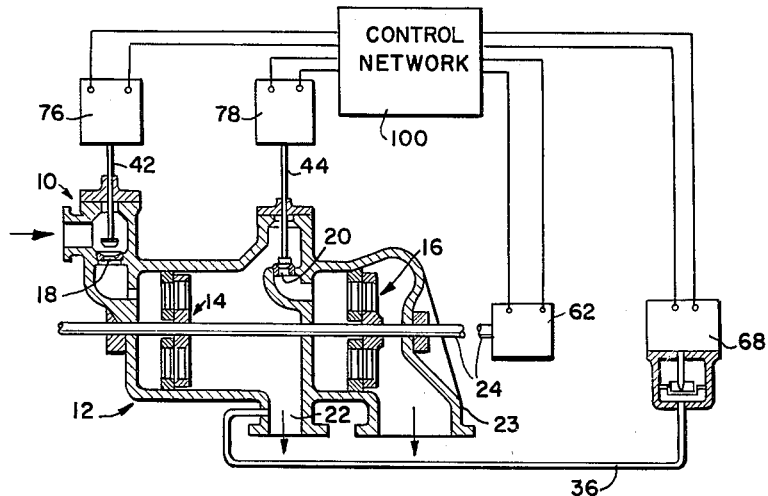
*INVENTORS*
JAMES B. WAGNER
KENNETH O. STRANEY
BY
Isidore Match
ATTORNEY

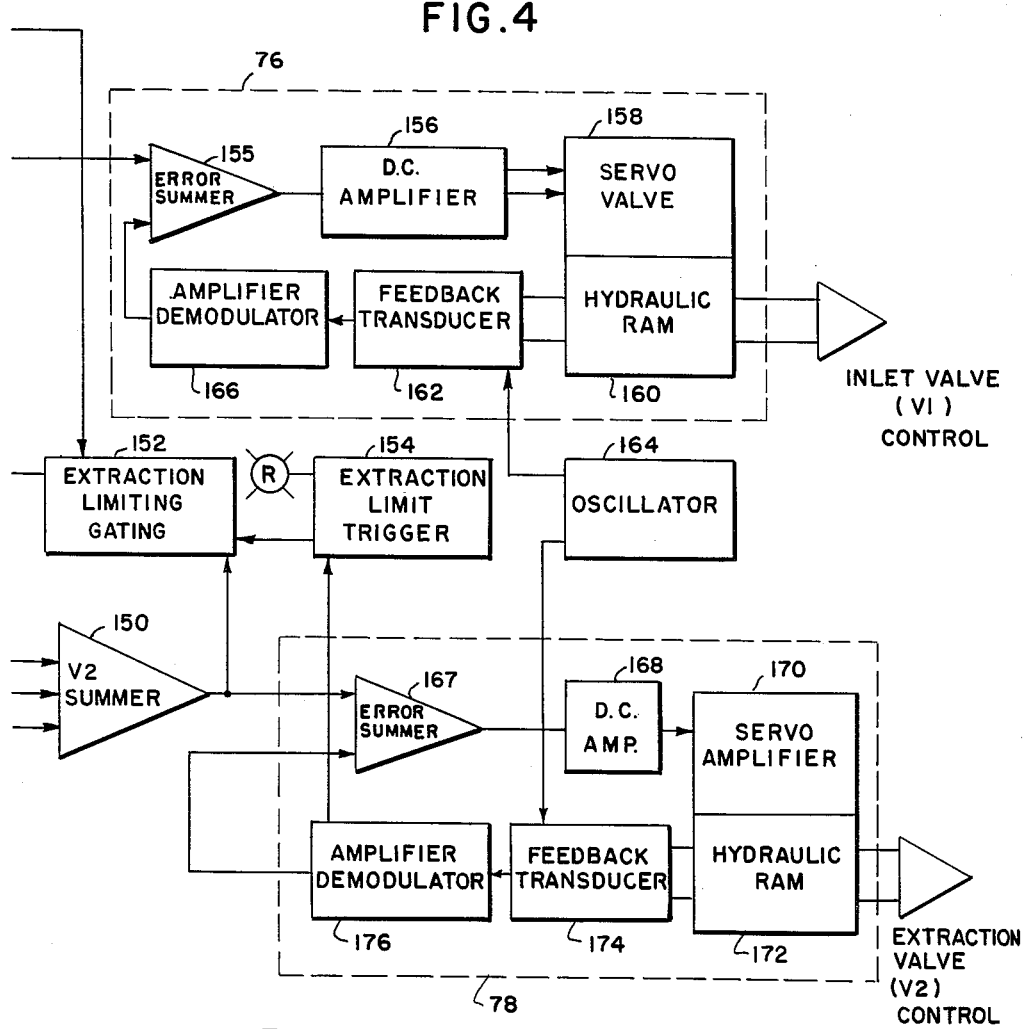
FIG.4
FIG.5
| FIG. 3 | FIG. 4 |
*INVENTORS*
JAMES B. WAGNER
KENNETH O. STRANEY
BY
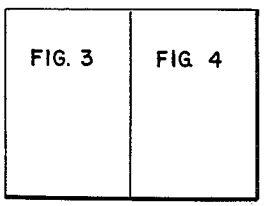
ATTORNEY June 4, 1963

J. B. WAGNER ET AL 3,091,933

CONTROL SYSTEM

Filed Dec. 7, 1960

INVENTORS
JAMES B. WAGNER
KENNETH O. STRANEY

BY

Isidore Match

ATTORNEY

June 4, 1963  J. B. WAGNER ET AL  3,091,933
CONTROL SYSTEM
Filed Dec. 7, 1960  13 Sheets-Sheet 5

INVENTORS
JAMES B. WAGNER
KENNETH O. STRANEY
BY
Isidore Match
ATTORNEY

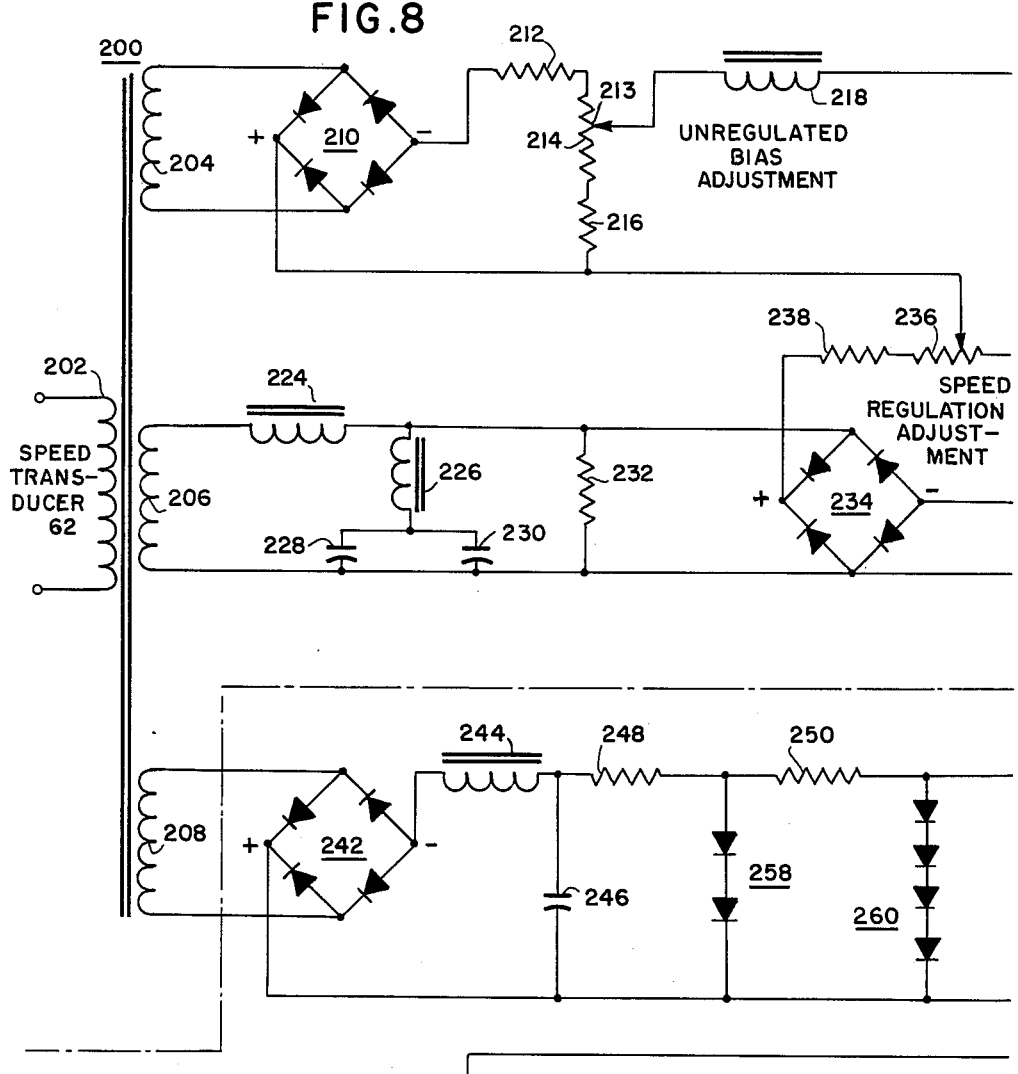
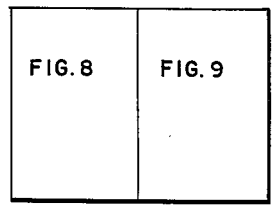

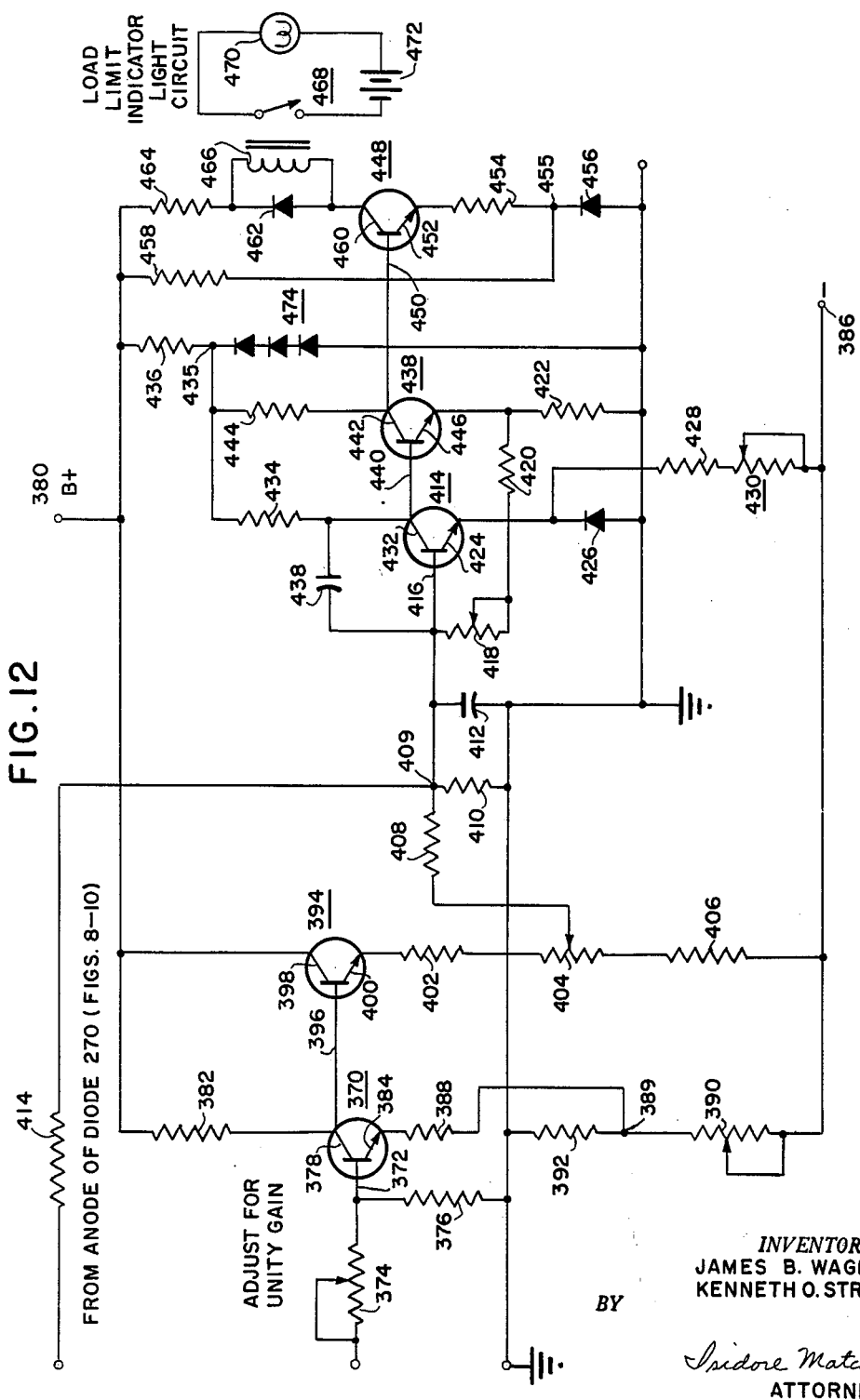

June 4, 1963 J. B. WAGNER ET AL 3,091,933
CONTROL SYSTEM
Filed Dec. 7, 1960 13 Sheets-Sheet 12
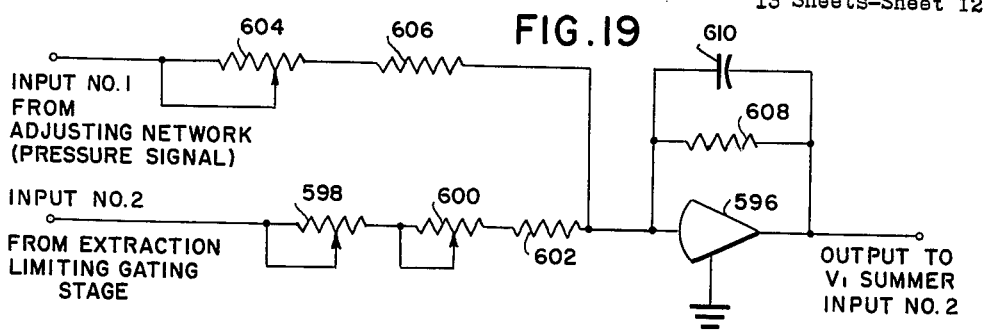
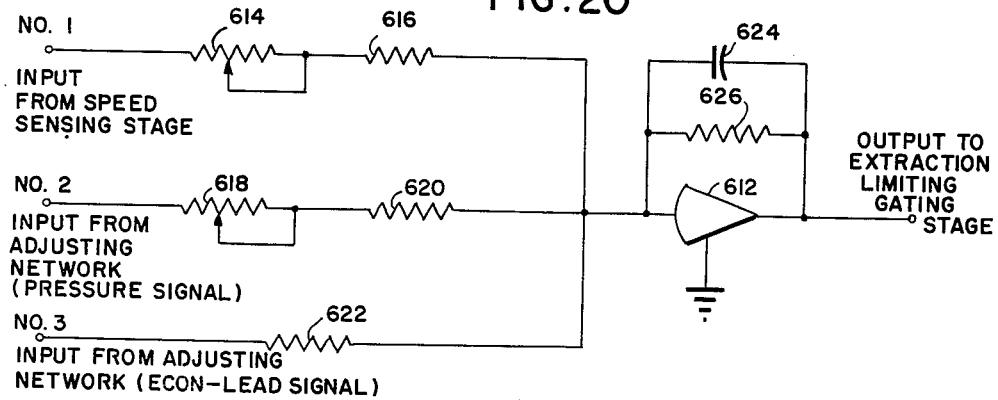
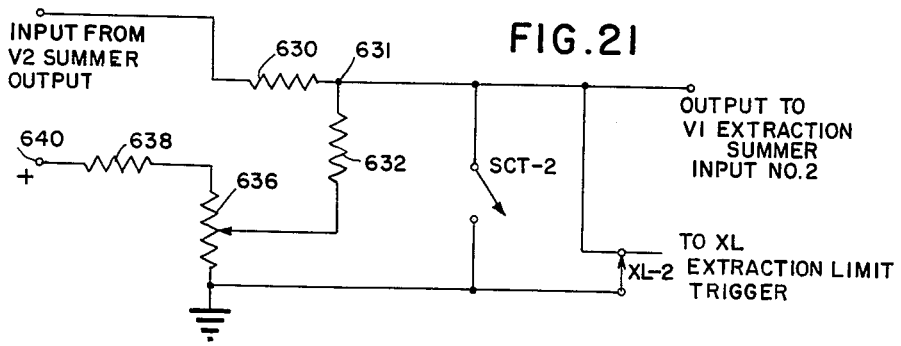
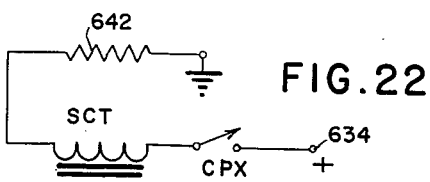
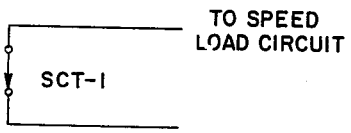
INVENTORS
JAMES B. WAGNER
KENNETH O. STRANEY
BY
Isidore Match
ATTORNEY

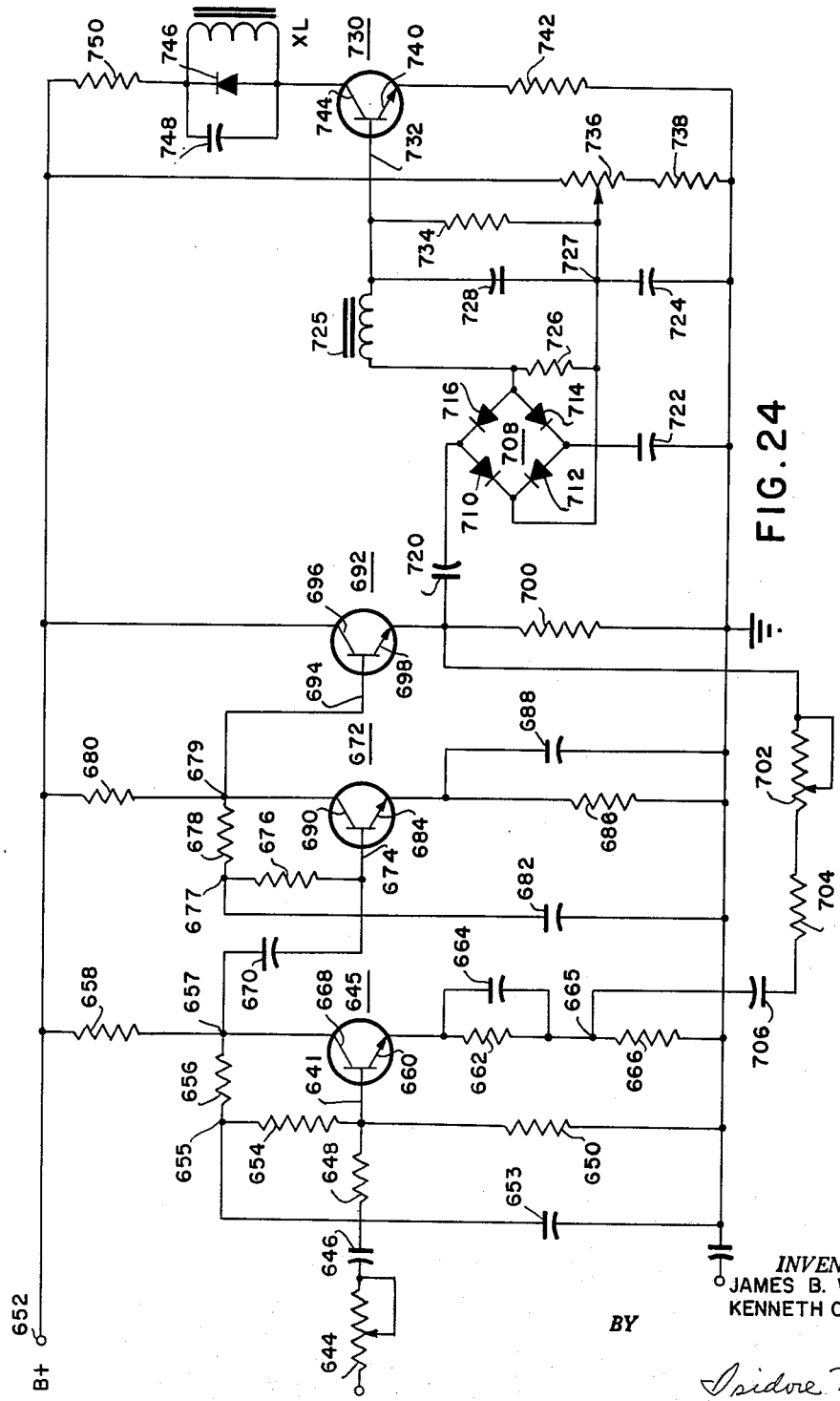

United States Patent Office 3,091,933
Patented June 4, 1963

3,091,933
CONTROL SYSTEM
James B. Wagner, Lynnfield, and Kenneth O. Straney, Danvers, Mass., assignors to General Electric Company, a corporation of New York
Filed Dec. 7, 1960, Ser. No. 74,425
32 Claims. (Cl. 60—67)

This invention relates to control systems for elastic fluid turbines. More particularly, it relates to an electric system suitable for use with multi-stage elastic fluid turbines of the extraction and mixed pressure type.

In multi-stage elastic fluid turbines of the type having an extraction conduit connected to an intermediate stage thereof for removing fluid therefrom under an intermediate pressure, at least one of the stages has an interstage valve that is operatively associated and cooperates with the inlet valve of the turbine to maintain substantially constant the pressure of the fluid in the extraction conduit connected to such stage. Ordinarily, the fluid used is steam and the steam extracted from the turbine through such conduit is employed for some useful purpose such as process steam, heating, etc. When a conduit is connected to an intermediate stage of the turbine for the purpose of supplying fluid thereto, in such case, the turbine is operated as a mixed pressure turbine.

When steam is extracted from an intermediate stage of the turbine during operation thereof, it is desirable to control the regulation provided by the inlet valve and the interstage valve in such a manner that the speed of turbine is maintained substantially constant irrespective of changes in the load on the turbine and even though the requirement for extracted steam may vary considerably. Also, it is desirable to maintain the pressure of the steam in the extraction conduit at a substantially constant value despite any change in requirement for extraction steam and irrespective of changes in load.

Heretofore, the inlet valve and the interstage valve in a turbine such as above described have generally had to be controlled by mechanical linkages and mechanical mechanisms which are actuated in response to changes in the speed of the turbine shaft and changes in the pressure of the steam in the extraction conduit.

Of necessity, such mechanical linkages have had to be massive and complex. This is in part due to the fact that a steam turbine is essentially a large device whereby the distance may be quite great between the output end of the turbine shaft where the speed control is located, and the input and interstage valves. Furthermore, the distance between the input valve and the interstage valve may also be quite substantial as may be the distance between the point on the extraction conduit whereat pressure is sensed and the location of the controls for the input and the interstage valves.

The speed with which such a mechanical system can respond to changes in the requirement for extraction steam or to changes in turbine load is, of necessity, limited by the inertia of the control linkages as well as by the inertia of the operating components of the turbine. Thus, when rapid changes occur in load either on the shaft of the turbine or in the extraction steam conduit, any excessive delay in response may cause great damage to the turbine and components auxiliary thereto. Also, mechanical linkages and control systems are quite prone to get out of proper adjustment and thereby respond improperly to desired changes in operating conditions. Further, mechanical systems have to be operated at locations immediately adjacent to the turbine since they are not suitably adaptable to remote control and remote operation.

Mechanical systems and linkages present the further disadvantages in that programmed operation such as computer-regulated systems cannot readily be utilized to control the turbine so as to integrate the turbine or the extraction steam valves into a programmed system. Also, both the initial cost and the maintenance cost of mechanical systems are relatively high and the period that a turbine may be disabled by the breakdown and the consequent necessary repair of mechanical control systems is quite long whereby there results a very damaging expense to the turbine user.

At this present time, when the needs of turbine users have become more demanding since electrical power systems have become large and process needs more exacting, a limit is reached in the good design of mechanical control systems beyond which such needs cannot be satisfied thereby.

Accordingly, it is an important object of this invention to provide an improved control system for elastic fluid turbines, i.e., an electrical control system having a high degree of reliability.

It is another object to provide an electrical control system for elastic fluid turbines which has a relatively fast response time to changes in operating conditions.

It is still another object to provide an electrical control system for an elastic fluid turbine of the type having a conduit connected to an immediate stage thereof to extract process steam therefrom, such system providing improved accuracy of control both as to the speed of the turbine shaft and as to the pressure of the fluid in the conduit with varying loads on the turbine shaft and varying requirements for process fluid.

It is another object to provide an electrical control system for an elastic fluid turbine which can be readily remotely operated.

It is a further object to provide an electrical control system for an elastic fluid turbine in which an improved flexibility of control is enabled in combination with greater accuracy of control and faster rates of response.

It is still a further object to provide an electrical control system for a fluid turbine which can be readily integrated with programmed systems.

It is yet a further object to provide an electrical control system comprising active elements which are solid state devices whereby there is provided a very high degree of reliability and whereby required maintenance of and repair of the control system is vastly minimized.

Generally speaking, and in accordance with the invention, there is provided in a multi-stage turbine which includes a rotatably mounted output shaft, an inlet valve governing the flow of fluid to the turbine, an extraction conduit connected to an intermediate stage of the turbine, and a valve governing the proportion of fluid which flows through the extraction conduit, first and second means for generating respective first and second signals. The first means is responsive to the speed of the output shaft, the first signal being a function of such speed. The second means is responsive to the pressure in the extraction conduit, the second signal being a function of such pressure. Means are provided for modifying the first signal with the second signal and for modifying the second signal with the first signal, the modified first signal controlling the position of the inlet valve, the modified second signal controlling the position of the extraction valve. There is also included gating means which when enabled counteracts the modification of one of the signals by the other of the signals, the gating means being enabled in response to the attaining of a chosen position of the valve controlled by the other of the modified signals whereby during the enabling of the gating means, the aforesaid one of the signals and the position of the valve controlled thereby is not affected by the other of the signals.

The features of this invention which are believed to be new are set forth with particularity in the appended claims.

The invention itself, however, may best be understood by reference to the following description when taken in conjunction with the accompanying drawings which show an embodiment of a control system in accordance with the invention.

In the drawings, FIG. 1 is a schematic view partly in section of a multi-stage turbine provided with an intermediate stage having an extraction conduit connected thereto and having an inlet valve and an interstage valve associated therewith, the control system for the valves being the mechanical governing system utilized heretofore in the prior art;

FIG. 2 is a view similar to that of FIG. 1 but showing the mechanical control system FIG. 1 replaced with the electrical control system of this invention;

FIGS. 3 and 4 taken together as in FIG. 5 is a block diagram of the control system of the invention;

FIG. 6 is a diagram of means utilized in the servo mechanism system of FIGS. 3–5 for providing stabilization;

FIG. 7 is a block diagram of a variation in the type of the servo mechanism used in FIGS. 3–5 and embodying a different stabilization arrangement;

Figure 3:
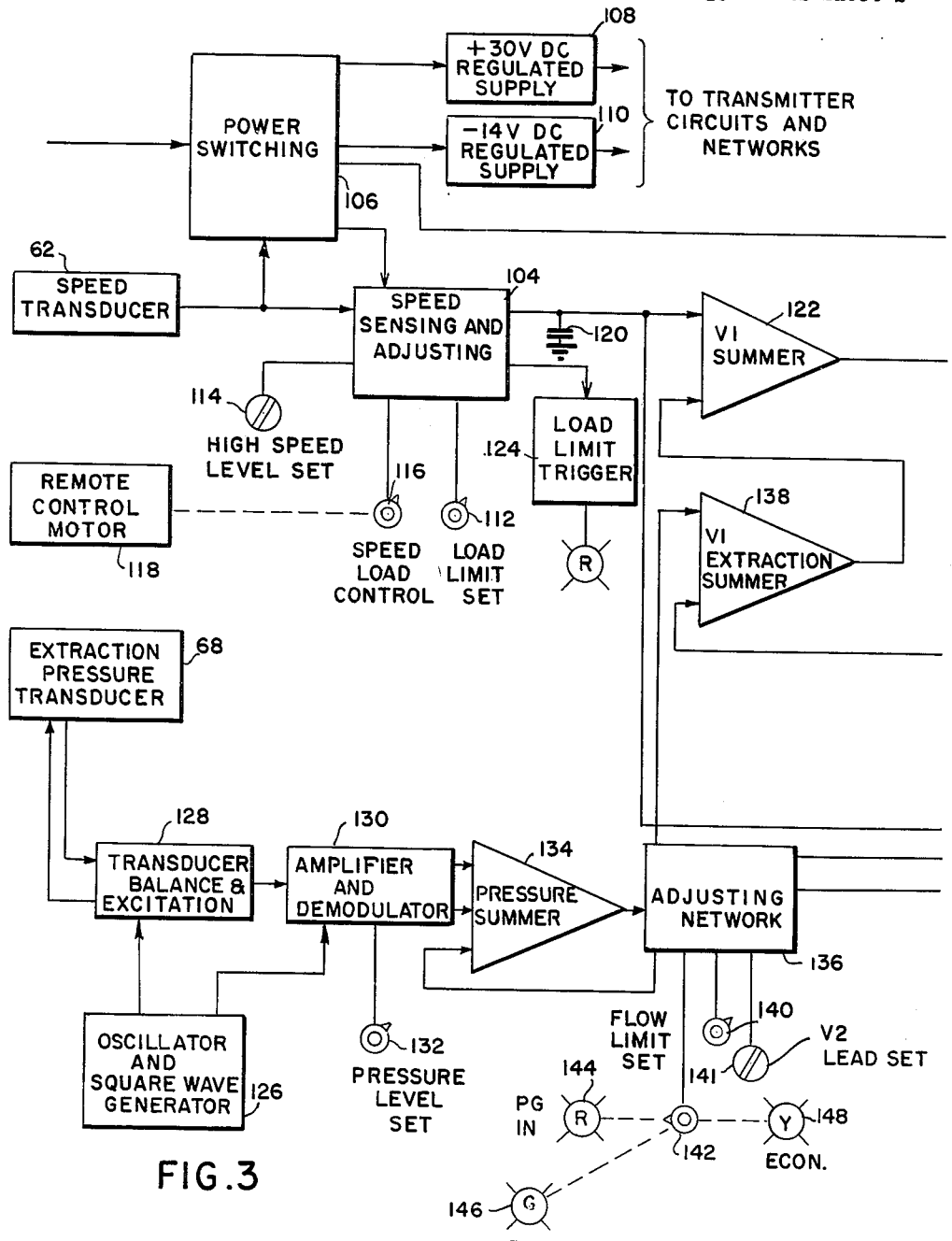
Figure 9:
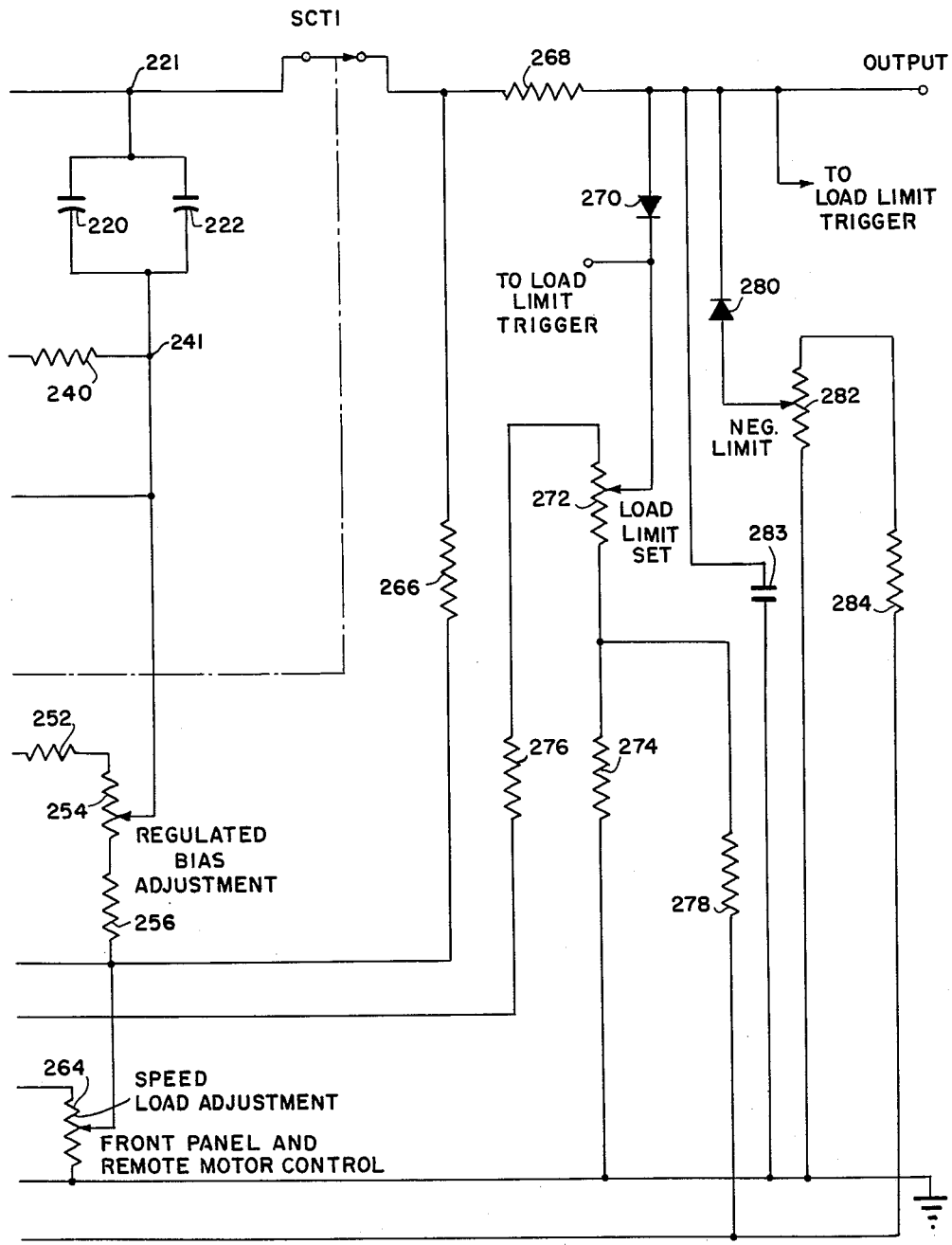
Figure 11:
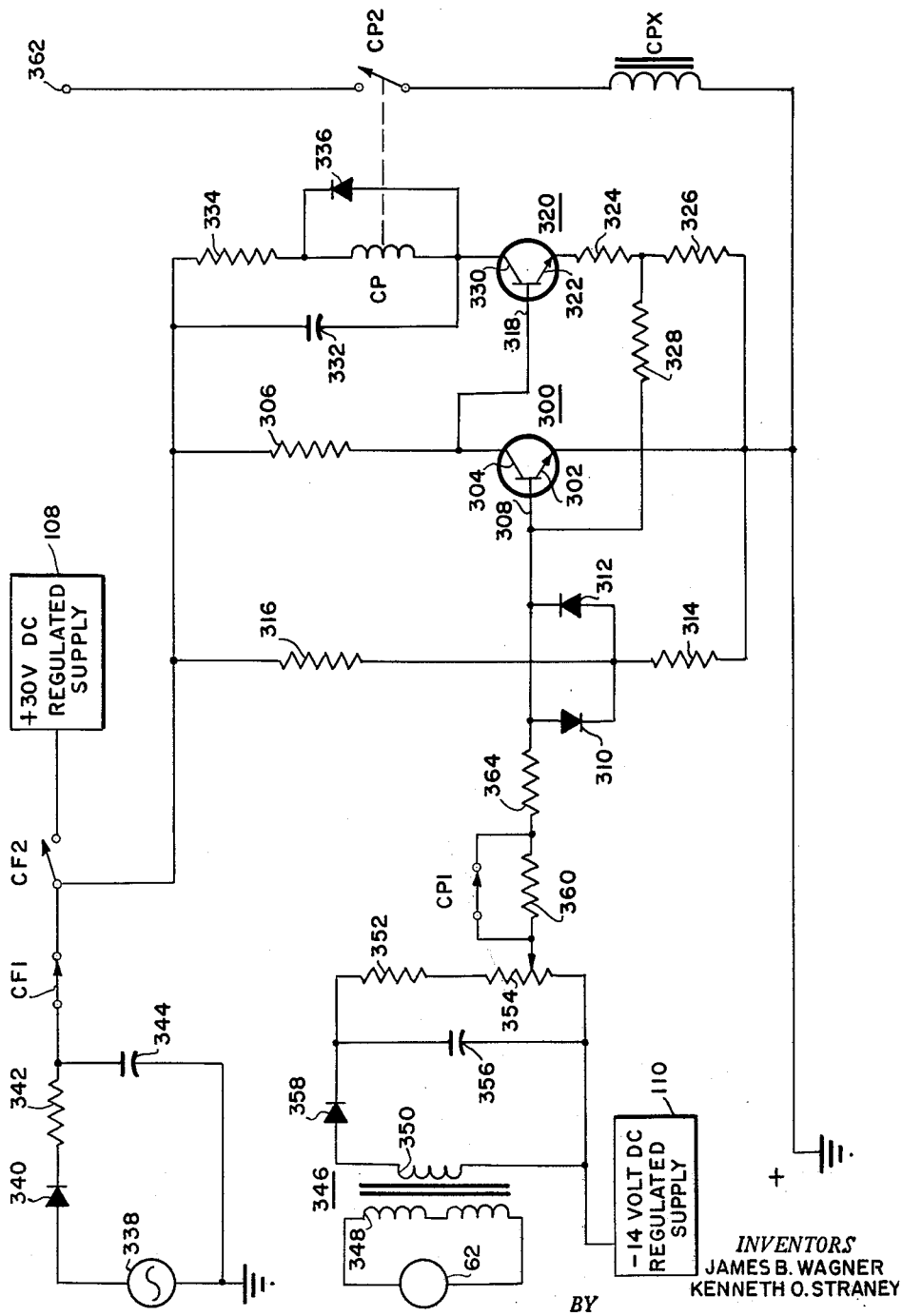
Figure 14:
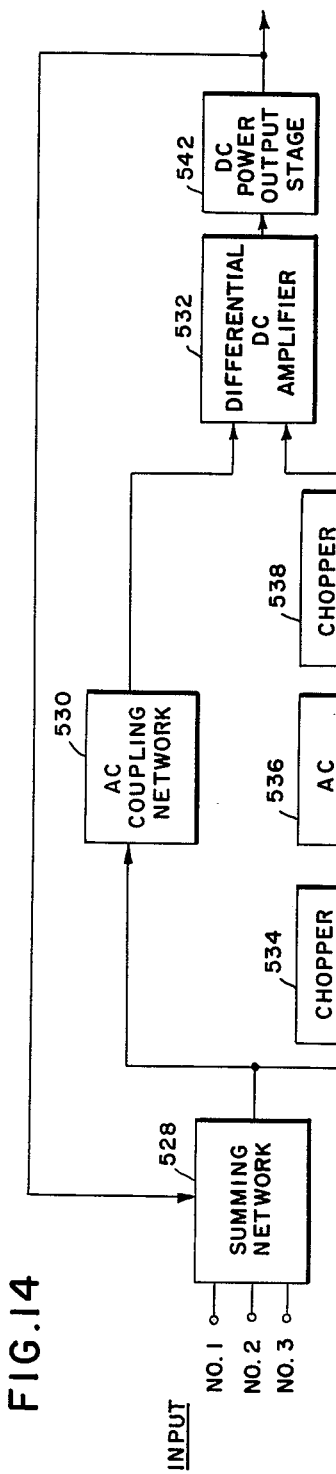
Figure 15:
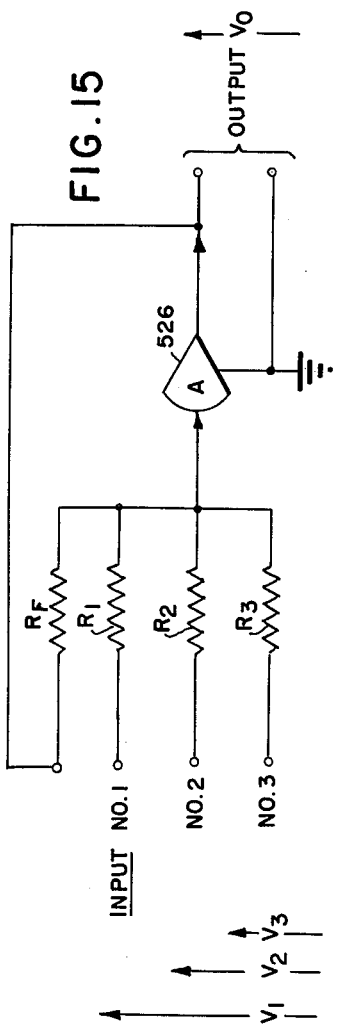
Figure 17:
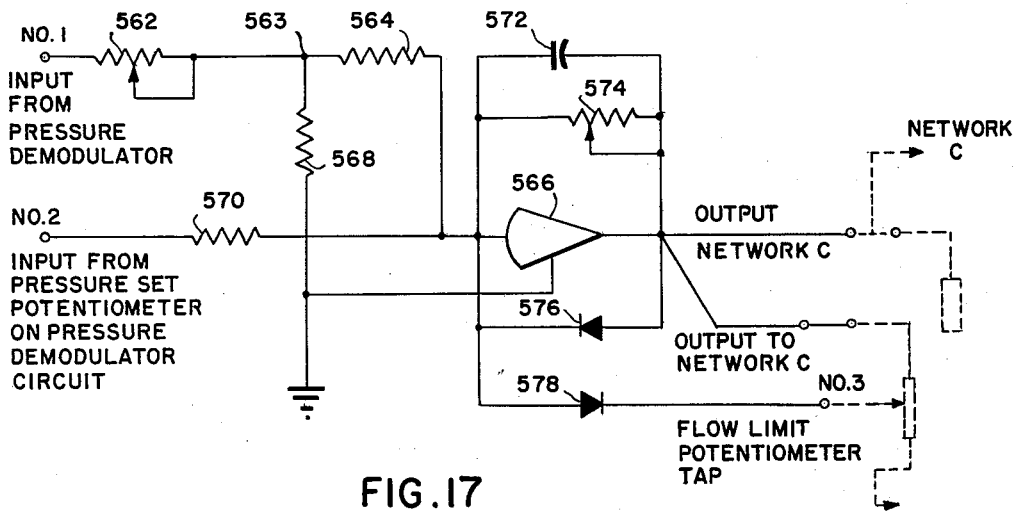
Figure 18:
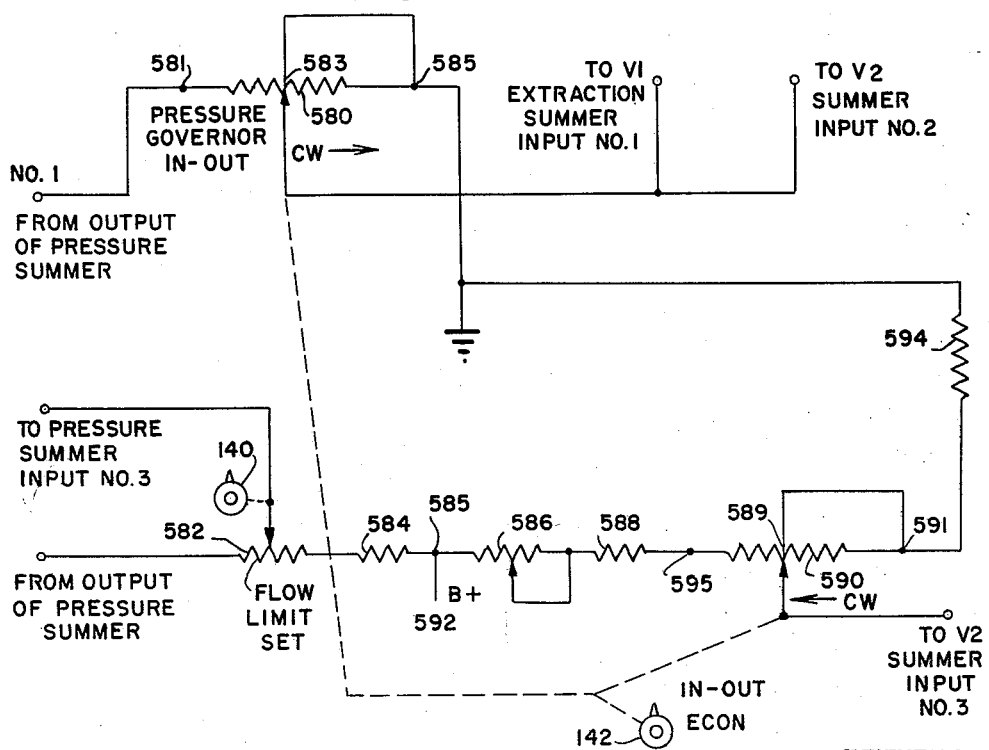

FIGS. 8 and 9 taken together as in FIG. 10 is a schematic diagram of an example of the speed sensing and load adjusting stage shown in FIGS. 3–5;

FIG. 11 is a schematic depiction of an example of the control power switching stage shown in FIGS. 3–5;

FIG. 12 is a schematic depiction of an example of the load limit trigger and light circuit depicted in FIGS. 3–5;

FIG. 13 is a diagram partially schematic and partially in block form of examples of the extraction pressure transducer, the transducer balance, and the amplifier-demodulator stage shown in block form in FIGS. 3–5;

FIG. 14 is a block diagram of operational summing amplifier utilized in the system of this invention;

FIG. 15 is a block diagram of a summing amplifier suitably utilized in the operational amplifier of FIG. 14;

FIG. 16 is a diagram of a circuit suitable for use as the $V_1$ summer shown in block form in FIGS. 3–5;

FIG. 17 is a schematic diagram of a suitable example of the pressure summer shown in block form in FIGS. 3–5;

FIG. 18 is a schematic diagram of a suitable example of the adjusting network shown in block form in FIGS. 3–5;

FIG. 19 is a schematic depiction of a suitable example of the $V_1$ extraction summer shown in block form in FIGS. 3–5;

FIG. 20 is a schematic diagram of a suitable example of the $V_2$ summer shown in block form in FIGS. 3–5;

FIGS. 21–23 are schematic diagrams of circuits utilized in and in conjunction with the extraction limiting gating stage shown in FIGS. 3–5; and FIG. 24 is a schematic depiction of a circuit suitable for use as an extraction limit trigger circuit shown in FIGS. 3–5.

Referring now to FIG. 1, there is illustrated a fluid multi-stage extraction turbine generally designated by the numeral 10 together with a known mechanical control system therefor, such control system embodying mechanical hydraulic linkages. Turbine 10 comprises a casing 12 supporting a rotatably mounted output shaft 24 and includes a plurality of stages, two representative stages being indicated respectively by designating numerals 14 and 16, stage 14 preceding stage 16. In the arrangement shown, casing 12 carries the usual stationary diaphragms arranged in cooperating relationship with the usual wheels rigidly secured to output shaft 24. Casing 12 is provided with an inlet valve 18 and an interstage valve 20, i.e., an extraction control valve, inlet valve 18 controlling the flow of the fluid from a boiler or other fluid source (not shown) to stage 14 and interstage valve 20 controlling the flow of elastic fluid from the intermediate or higher stage 14 to the lower stage 16, thereby governing the proportion of extraction fluid (as is further shown hereinbelow). It is to be understood that inlet valve 18 and interstage valve 20 in actual practice are each a multiple system of a multiplicity of mechanically coacting units which open sequentially in response to a single input mechanical motion such as provided by a hydraulic ram actuator. Casing 12 is also provided with an extraction conduit 22 which is arranged to extract fluid following stage 14 and immediately preceding stage 16. Casing 12 is further provided with an exhaust conduit 23 which may be connected to a condenser or utilization device (not shown). The mechanical output of the turbine is taken from output shaft 24 in a suitable manner. For example, an electric generator (not shown) may be operatively connected thereto as a load.

The governing mechanism which is provided to control inlet valve 18 and interstage valve 20 is responsive both to the speed of shaft 24 and consequently to the load thereon, and to pressure of the fluid in conduit 22. The speed of shaft 24 is sensed by a speed governor 26 that is driven from shaft 24 by means of a worm 28 and a worm gear 30. The pressure in conduit 22 is sensed by a device 32 which includes a casing 34 which is connected by a pipe 36 to conduit 22. Disposed within casing 34 is a bellows 38 which is moved in response to changes in pressure in pipe 36.

Governor 26 in conjunction with pressure sensing device 32 drives a three-arm lever, generally designated by the numeral 40, which interconnects the valve stems 42 and 44 that respectively control valves 18 and 20. Lever 40 includes a first outwardly extending arm 46 pivotely connected to the upper end of valve stem 42 and a second arm 48 pivotedly connected to the upper end of valve stem 44. Extending upwardly from the junction of the arms 46 and 48 is a third arm 50 which is pivotedly connected to a control rod 52 that, in turn, is connected to bellows 38. The point on lever 40 below arm 50 is connected by a link 54 at the pivot point 56 to governor 26.

Changes in the load on shaft 24 cause corresponding changes in the speed of rotation thereof. Any change in the speed of rotation of shaft 24 causes centrifugal speed governor 26 to move link 54 either upwardly or downwardly, thereby moving valve stems 42 and 44 by equal amounts. Consequently, a substantial amount of steam can be added, for example, to increase the speed of shaft 24 without changing the pressure in the extraction conduit 22, since the opening of valve 18 to increase the amount of steam is accompanied by an opening of valve 20 by an amount effective to maintain the pressure substantially constant in stage 14. An increase in the speed of shaft 24 causes reverse action to occur, thereby to change the total fluid fed to turbine 10 without changing the pressure in extraction conduit 22.

Any change in pressure within conduit 22 is transmitted to pressure sensing device 32 and causes a movement of rod 52. Movement of control rod 52 causes the pivoting of lever 40 about the pivot 56 thereby simultaneously either to open valve 18 and to close valve 20, or to close valve 18 and to open valve 20. Accordingly, any change in pressure in extraction conduit 22 effects an adjustment of valves 18 and 20 with respect to each other to cause a lesser or greater flow of fluid from stage 14 through valve 20 as may be required to adjust the pressure within extraction conduit 22.

The control mechanism depicted in FIG. 1, although generally capable of relatively adequately compensating for gradual changes in the load upon shaft 24 and changes in demand for steam through extraction conduit 22, is quite inflexible in that only two basic movements are permitted, viz., the pivoting of lever 40 about pivot point 56 and the vertical shifting bodily of lever arm 40. The results of various attempts which have been made to impart a greater flexibility to such mechanical control systems have been to provide even more mechanically complicated devices which, in many respects, are less satisfactory than the relatively simple governing mechanism depicted in FIG. 1.

In FIG. 2, there is shown a schematic representation of an arrangement in which the control system of this invention is used to control turbine 10 of FIG. 1. Where appropriate, the same reference numerals have been utilized to designate like elements. In this arrangement, the motion of shaft 24 is applied to a transducer 62, suitably a permanent magnet generator, which serves to provide an electric signal that is a function of the speed thereof, the signal being applied to a control network generally designated by the numeral 100. The pressure in the extraction conduit 22 is connected by pipe 36 to a pressure transducer 68 which provides an electric signal that is a function of such pressure. Both electric signals are applied to control network 100 wherein they are combined in accordance with the principles of the control system of this invention to provide control signals that are respectively applied to servomechanisms 76 and 78. The servo-mechanisms 76 and 78 are connected respectively to the inlet and interstage valve stems 42 and 44, thereby controlling valves 18 and 20, respectively.

In FIGS. 3–5, there is shown in block form the arrangement of the control network of the invention including the speed and pressure transducers 62 and 68 and the speed and pressure servo-mechanisms 76 and 78. Shaft 24 actuates speed transducer 62 which provides a sinusoidal voltage output having an amplitude which is proportional to speed. Such transducer may suitably be a permanent magnet generator of the type well known in the art. For example, in the event that there is utilized a fourteen pole permanent magnet generator, i.e., comprising seven pairs of poles, the frequency of the sinusoidal wave output will be seven times the revolutions per second of the turbine shaft. Thus, with a shaft speed of 3600 revolutions per minute, i.e., 60 revolutions per second, speed transducer 62 provides a sinusoidal output voltage having a frequency of 420 cycles per second.

The A.C. voltage output produced by speed transducer 62 is applied both to a speed sensing and adjusting stage 104 and to a power switching stage 106.

To understand the function of power switching stage 106, it is to be realized that the voltage output from transducer 62 is utilized as the supply voltage for the electrical system. Such voltage is, of course, produced when the turbine shaft is rotating. In the event that the turbine shaft rotation is not occurring, power switching stage 106 enables the utilization of the readily available line A.C. voltage for initially actuating the electrical system. Stage 106 itself may be powered by an A.C. voltage suitably transformed down from the line voltage to one having an amplitude of about 24 volts and a frequency of about 60 cycles per second. It is seen in FIGS. 3–5 that the output of power switching stage 106 is applied as a supply voltage to a stage 108 which provides a regulated positive D.C. output such as +30 volts and to a stage 110 which provides a regulated negative output such as −14 volts, stages 108 and 110 being the D.C. supply voltages for the electrical system.

Speed sensing and adjusting stage 104 produces an output D.C. voltage having an amplitude which is, in general, proportional to the frequency of the A.C. voltage produced at the output of speed transducer 62. Knob 116 is adapted to control a potentiometer which is set to provide a voltage level about which variations of turbine speed are referenced. A maximum adjustable reference voltage level is enabled to be provided by the setting of a high speed level set potentiometer which knob 114 is adapted to control, the latter setting providing a maximum speed level for the turbine shaft with no load. A maximum load control is provided by a load limit set potentiometer and controlled by a knob 112, such potentiometer functioning to limit the maximum positive voltage which may be provided. Accordingly, the load limit set potentiometer limits the maximum degree of opening possible of the inlet valve and extraction valve in response to shaft speed changes and load independent of the settings of the potentiometers controlled by knobs 114 and 116. A speed load control potentiometer controlled by a knob 116, which is associated with a remote control motor 118 to permit the remote positioning thereof, is adjusted to provide a selected shaft speed with no load. After synchronization of turbine speed in an electric power network, it is then further adjusted to provide a desired load level for the turbine.

The circuit elements of speed sensing and adjusting stage 104 are so arranged and their values are so chosen that the D.C. output thereof decreases in magnitude with increasing turbine speed.

The output of stage 104 is applied as one input to an adder network 122, legended $V_1$ summer ($V_1$=inlet valve). The $V_1$ summer may suitably be an operational amplifier or a passive resistance network adder operatively in conjunction with a D.C. amplifier. The other input to $V_1$ summer 122 is further explained hereinbelow.

The output of speed sensing and adjusting stage 104 is also applied as an input to a load limit trigger stage 124. The function of the latter stage is to provide an indication as to whether the output of speed sensing and adjusting stage 104 is being limited in accordance with the setting of potentiometer controlled by knob 112, i.e. whether a voltage is being provided from stage 104 which in the absence of such potentiometer and associated circuitry would be greater than the voltage as determined by such potentiometer. In the event that such limiting is actually occurring, then an indication such as the lighting of a lamp is provided by load limit trigger stage 124. The output of stage 104 is also applied as an input to the $V_2$ summer 150, the operation of which will be further explained hereinbelow.

Referring now to the lower or pressure signal channel of FIGS. 3–5, there is shown extraction pressure transducer 68 which suitably may be a Bourdon tube differential transformer type transducer which provides an output signal proportional to the pressure in extraction conduit 22.

The output of extraction pressure transducer stage 68 is excited by a signal such as 2.5 kc. sinusoidal voltage which is produced at the output of an oscillator 126. In the stage legended as transducer balance and excitation 128, the output transducer 68 is balanced to a null through a null balance network. The output of stage 128 is a signal of the frequency of oscillator 126 modulated by the signal which is a function of changes in the extraction pressure from the null pressure. In extraction pressure transducer 68, a relatively gross adjustment may be made to provide a substantially zero voltage at a desired base or operating pressure. Stage 128 then comprises a suitable circuit which can be utilized to finely adjust the voltage to zero at such operating pressure. As will be further explained, the null voltage is desirably obtained at the highest desired extraction pressure.

In stage 130, legended as an amplifier demodulator stage, there is applied the output of stage 128 together with the square wave output produced by oscillator and square wave generator 126. In the amplifier portion of stage 130, the output of stage 128 is amplified. The square wave signal output from oscillator 126 is mixed with the amplified output thereafter to chop any amplified signal resulting from a deviation from the chosen null pressure, such chopped signal including a unidirectional component. The chopped signal is filtered whereby at the output of stage 130, there is provided a substantially unidirectional signal which is indicative of a pressure deviation from the null condition.

A pressure level set potentiometer controlled by a knob 132 is included to provide a chosen reference voltage level which represents a desired pressure level for which it is desired that the system operate at. Such pressure, of course, cannot exceed the null level initially chosen. A chopper demodulator is utilized in stage 130 rather than a rectifier to insure that in the event that the pressure exceeds the null pressure, the unidirectional potential output of stage 130 is reversed in sign when the pressure exceeds such null pressure. In other words, a negative voltage is provided in the latter situation as will be further explained.

The output of amplifier demodulator stage 130 and the setting on potentiometer 132 are applied as first and second inputs to a pressure summer stage 134 which may suitably be an operational amplifier arranged to function as an adder or a passive resistance network operatively in conjunction with a D.C. amplifier. The third input to pressure summer 134 is from the adjusting network 136 and is suitably a bias voltage to the D.C. amplifier included in pressure summer 134 which causes pressure summer 134 to operate as a limiting summer. The functional effect of this bias voltage is to set a maximum flow limit through the extraction conduit. This is accomplished by providing a maximum voltage level indicative of a maximum flow. The output of the pressure summer is a unidirectional voltage which represents a deviation from the null selected by the pressure level set and also represents a flow limit not exceeding a chosen maximum. Pressure summer 134 also suitably provides a limiting function for the maximum, i.e., the selected null pressure. This is accomplished by circuitry which insures that any pressure exceeding the null pressure results in no output from pressure summer 134.

In the adjusting network 136, there is provided a first output which is applied to the $V_1$ extraction summer stage 138, the latter output being the voltage appearing at the output of pressure summer 134. There is further provided a second output which represents an algebraic addition of the voltage of the output of pressure summer 134 with the voltage taken from a potentiometer 140 to provide the flow limit set voltage as previously explained which is applied as the third input to pressure summer 134. There is also provided a third output from adjusting network 136 which is the output of pressure summer 134. A fourth output of stage 136 is a fixed potential adjustable by a potentiometer controlled by a knob 141 which is provided to adjust the initial position of the extraction valve stem relative to the inlet valve stem. This voltage may be increased by a large step in magnitude when potentiometer control knob 142 is rotated to the economy position to open extraction valve $V_2$ by a large amount. This fourth output is applied as a third input to the $V_2$ summer 150.

Control knob 142 is associated with two ganged potentiometers, viz., an economy potentiometer and a pressure governor in-out potentiometer. Lights 144 and 146 indicate the positions of the pressure governor potentiometer and light 148 indicates the position of the economy potentiometer. Pressure governor "in" indicates a relatively more closed position of the extraction valve and pressure governor "out" indicates a relatively more open position of the extraction valve. Economy operation is employed only when the turbine is to be operated with no controlled extraction flow, i.e., with no control of the extraction conduit pressure. The ganging of the potentiometers insures that such situation is assured. This is further explained in detail hereinbelow.

In the $V_2$ summer 150 which may be an operational amplifier arranged to function as an adder, or a passive resistance adding network operatively in conjunction with a D.C. amplifier, there are applied as inputs, the heretofore described third and fourth outputs of adjusting network 136 together with the output of speed sensing and adjusting stage 104.

The output of $V_2$ summer 150 is a D.C. voltage which represents the desired position of the extraction valve $V_2$ and is the combination of three components, a first component being that provided from the output of the speed sensing and adjusting network which represents a desired speed and error from that speed, a second component being provided from pressure summer 13 through adjusting network 136 which represents a desired extraction conduit pressure and error from that pressure, and a third component is provided from the adjusting network 136 which represents the initial indexing or lead position of the extraction valve relative to the position of the inlet valve.

The output of $V_2$ summer 150 is applied to an extraction limiting gating network 152 which provides an output under given conditions. While power switching during the starting up of the turbine when the turbine is still on auxiliary power, the extraction limiting gating network is maintained disabled by the signal input from power switching stage 106.

When the speed of operations attains a desired point in the starting up of the turbine and at the time that power switching stage 106 is switched from operation on auxiliary power to operation on power from speed transducer 62, extraction limiting gating stage 152 is enabled to permit a portion of the output from $V_2$ summer 150 to be applied as an input to $V_1$ extraction summer 138. Accordingly, the output of $V_2$ summer 150 is applied as a second input to the $V_1$ extraction summer stage 138. Another necessary condition for the passage of the output of the $V_2$ summer 150 through stage 152 is that the position of the extraction valve be at or below a chosen position. Such chosen position is determined in conjunction with the operation of the extraction limit trigger circuit 154.

Reference can now be made to the operation of the $V_1$ summer stage 122. It is seen that the inputs thereto are the output of speed sensing and adjusting stage 104 and the output of the $V_1$ extraction summer stage 138. The latter output is the summation of a voltage proportional to the output of pressure summer 134 and a voltage proportional to the output of $V_2$ summer 150 when speed of operation is above the aforesaid desired level. Below that level, the output of the $V_1$ extraction summer is of necessity zero. Above such desired level, the output of the $V_1$ extraction summer may be zero or may be a voltage greater than zero. Accordingly, the voltage output of $V_1$ summer 122 results from the combination of a first component representing the desired speed of operation and the error from that operation and a second component representing the desired pressure in the extraction conduit and the deviation from such pressure.

In understanding the operation of extraction limiting gating stage 152, it is to be realized that with the extraction valve in an open position, extraction limiting gating network 152 is not enabled whereby, effectively, the only input to the $V_1$ extraction summer 138 is the output of pressure summer 134 applied through adjusting network 136.

When extraction valve $V_2$ is caused to assume the closed position due to demand for extraction steam, the extraction limit trigger stage 154 causes the enabling of the extraction limiting gating stage 152 whereby the output of the $V_2$ summer is applied as a second input to $V_1$ extraction summer 138. Since $V_2$ summer 150 contains a D.C. amplifier having a 180° phase shift, the pressure component of the second input to the $V_1$ extraction summer 138 is opposite in sign from its first input. Since the pressure inputs are substantially equal, the output of the $V_1$ extraction summer when the extraction valve is in the closed position is zero with respect to the pressure whereby the output of the $V_1$ summer in this situation reflects only its input from speed sensing and adjusting stage 104 plus the speed component from the output of $V_2$ summer 150. The lead set component in the output of $V_2$ summer is subtracted out by an adjustment in the extraction limiting gating stage 152. With this arrangement, therefore, the speed of the turbine is no longer influenced by pressure once the extraction valve assumes the closed position. However, there is an increased rate of output from $V_1$ summer 122 in response to the output of speed sensing and adjusting stage 104 so as to maintain the desired speed load regulation of the turbine and its load. The extraction limit trigger may suitably be a relay actuated voltage comparator as will be further explained hereinbelow.

The output of $V_1$ summer stage 122 is applied to a servo-mechanism 76. Specifically it is applied as one input (No. 1) of an error summer 155 which may suitably be a passive resistance network operatively associated with a D.C. amplifier or it may be a high gain operational amplifier arranged to function as an adder and providing a 180° phase shift.

The output from error summer 155 is applied to a D.C. amplifier 156. D.C. amplifier is preferably chosen to have a high gain with sufficient power output to drive the torque motor coils of a servo valve 158. If error summer 155 is an operational amplifier, then D.C. amplifier 156 should suitably have sufficient gain to provide the necessary power to drive the aforesaid torque motor coils.

If the torque motor coils are driven in push-pull, then there is required a double ended output from D.C. amplifier 156. If the torque motor coils are connected for parallel operation, then D.C. amplifier 156 need only have a single ended output.

The output from amplifier 156 is applied to a hydraulic servo valve 158, such output being applied to a torque motor associated with the valve. Valve 158 may be of the conventional torque motor type used in servo valve construction and having one or two coils. Servo valve 158 may be of the four-way action type, and of the type in which there is supplied oil thereto under high pressure and its function is to control a hydraulic ram 160. The flow rate through servo valve 158 is proportional to the current delivered from the output of amplifier 156. The size of ram 160 is chosen such that it can provide the force requirements to operate the stem of input valve 18 shown in FIGS. 1 and 2.

The position of hydraulic ram 160 is translated to a voltage by means of a feedback transducer 162. Feedback transducer 162 may suitably be of the well-known variable reluctance type wherein the position of a magnetic slug determines the inductance of two halves of a continuous winding. When such inductance is measured in a standard bridge circuit, there is produced an A.C. output having an amplitude determined by the position of the slug. The bridge circuit is balanced to produce a null output for the fully closed ram position. The completely closed position of a ram signifies the completely closed position of the valve plus any mechanical overtravel provided in the connecting mechanism between a ram and a valve. As is shown in FIGS. 3–5, transducer 162 is powered by an oscillator 164.

The A.C. voltage output of transducer 162 is amplified in an amplifier demodulator stage 166 and such amplified voltage is then demodulated. The amplifier in this stage is, of course, an A.C. amplifier. The demodulator includes a filter and may be a rectifier or phase sensitive detector for converting the output of the A.C. amplifier to a unidirectional potential which accurately represents ram position. The arrangement of the circuit components are so chosen that the output voltage of stage 166 is opposite in sign to the sign of the output voltage from $V_1$ summer 122. The total amplification of amplifier demodulator stage 166 is chosen so that its output is equal in value to and opposite in sign to the output voltage of $V_1$ summer 122.

Accordingly, in error summer 155, the unidirectional potential outputs of amplifier demodulator stage 166 and the $V_1$ summer 122 are added. Thus, any output from error summer 155 is an error voltage which effects the adjustment of the position of the inlet valve $V_1$ to a position which reflects the voltage output from $V_1$ summer 122.

The values of the components in servo loop 76 are so chosen that a suitable voltage such as about five volts produces "full stroke" motion of the hydraulic ram. By "full stroke" motion is meant movement from the completely closed to the completely open position of a hydraulic ram.

The servo loop such as loop 76 is included in the system of the invention to produce a position of a valve (in this situation, the position of inlet valve $V_1$), substantially exactly proportional to the position represented by the output of $V_1$ summer 122 substantially independent of reaction forces on the inlet valve $V_1$. It is readily appreciated that these reaction forces are quite great and may be in the order of many thousands of pounds. In addition, there may be regions of abrupt negative force gradients. The position feedback servo mechanism such as loop 76 insures accurate positioning of the valve substantially independent of the strength and the non-linearities of these reaction forces.

Similarly, in the pressure channel, the output of $V_2$ summer 150 is applied to a servo mechanism 78, i.e., specifically as a first input to an error summer 167, the output of which is applied to a D.C. amplifier 168. The output of amplifier 168 is applied to the torque motor coils of a servo valve 170. Upon actuation of valve 170, oil under pressure is fed to a hydraulic ram 172 which is connected to the valve stem of extraction valve $V_2$. Here again, as with the inlet valve, the flow rate is proportional to the current delivered from the output of amplifier 168. Ram 172 is chosen to have a size such that it can impart the necessary force requirements to the valve stem of the extraction valve.

Changes in the position of the hydraulic ram 172 from an initial set position, preferably the closed position, and, therefore, consequent changes of the extraction valve $V_2$ from the corresponding set position cause the generation of a voltage by feedback transducer 174 proportional to the actual opening of the extraction valve.

The A.C. voltage output of transducer 174, which is also powered by oscillator 164, is applied to an amplifier demodulator stage 176 wherein it is amplified and demodulated and thereafter filtered to remove the A.C. component therefrom.

The unidirectional potential output of amplifier demodulator stage 176 is then applied as a second input to error summer stage 167.

The elements comprising servo loop 78 may be chosen to be similar to the corresponding elements of servo loop 76 and the circuit values may also be the same so that loop 78 functions in the same manner as loop 76 and for the correspondingly similar purpose.

In FIG. 6 there is shown one arrangement in error summers 155 and 167 of servo loops 76 and 78 in FIGS. 3–5 for providing stabilization. It is seen in this figure that a capacitor $C_S$ is connected in parallel with the position feedback input from the amplifier demodulator (stage 166 or 176, FIGS. 3–5). Such capacitor provides correction for phase shifts in the servo valve-hydraulic ram combination so that the closed loop servo mechanism is stable, i.e., non-oscillatory for the value of the gain selected for the total loop gain. The value of capacitor $C_S$ is selected in accordance with servo mechanism design practice and is determined by the particular sizes of the servo valve and hydraulic ram respectively as chosen for a particular application.

In FIG. 7 there is shown an embodiment of the servo loops 76 and 78 of FIGS. 3–5 and including a second form of stabilization. Since loops 76 and 78 are similar in structure and function, the elements in the circuit of FIG. 7 have been designated with the numerals utilized in loop 76.

In the circuit of this figure, it is seen that all the elements of loop 76 are included in the same arrangement. In addition the movement of the hydraulic ram is applied to a velocity transducer 163, the output of which is applied as an input to a D.C. amplifier 165. The output of D.C. amplifier 165 is applied as a third input to error summer 155.

Velocity transducer 163 may suitably be of the well known type which produces a unidirectional output voltage proportional to the instantaneous velocity of the ram and whose polarity of signal is determined by the instantaneous direction of travel of the valve. If the valve travel is in the more open position direction, the polarity is negative. If the valve is in the more closed position direction, the polarity is positive. A typical example of transducer 163 is a linear velocity transducer coil having a magnetized slug.

D.C. amplifier 165 does not produce a phase shift and its gain is selected for proper loop gain in accordance with servo mechanism design practice.

In the servo mechanism system of FIG. 7, there is not utilized the stabilizing capacitor as shown in FIG. 6. In this system, the feedback signal from the amplifier-demodulator stage 166 still counteracts the output of the $V_1$ summer. Velocity transducer 163 produces a compensating signal to provide stable operation with optimum response.

*Speed Sensing and Load Adjusting (FIGS. 8–10)*

The circuit of FIGS. 8–10 may be described for convenience of explanation as comprising three sections, viz., those sections associated with secondary winding portions 204, 206, and 208 of transformer 200, the signal being applied to the circuit from the permanent magnet generator, i.e., speed transducer 62 (shown in FIGS. 3–5) to the primary winding 202 of transformer 200.

The section associated with secondary winding portion 204 produces an A.C. voltage having an amplitude directly proportional to the amplitude of the voltage produced from the permanent magnet generator. In this section, the voltage across secondary winding portion 204 is full wave rectified in rectifier 210 and then is applied through a resistor 212 and across a series combination comprising a variable resistor 214 and resistor 216. A portion of the voltage across resistors 214 and 216 is filtered by inductor 218 and capacitors 220 and 222. As is stated in the legend, the voltage taken via a tap from resistor 214 is the unregulated bias adjustment voltage. Such voltage is chosen whereby at a desired operating speed, the voltage between junction points 221 and 241 is zero as will be further explained.

The section associated with secondary winding portion 206 produces a voltage which is both proportional to the amplitude and the frequency of the voltage produced at the output of permanent magnet generator 62. In this section, the frequency sensitive elements are series connected inductor 224, parallel connected inductor 226 and capacitors 228 and 230. The values of these elements are so chosen that inductors 224 and 226 resonate with capacitors 228 and 230 at a frequency below the operating range of the turbine and inductor 226 resonates with capacitors 228 and 230 at a frequency above the operating range of the turbine. Consequently, the voltage developed across resistor 232 is at a maximum at the lower resonating frequency and at a minimum at the higher resonating frequency. The voltage is rectified in full-wave rectifier 234 and also filtered by capacitors 220 and 222 and inductor 218. A portion of the output taken from a point on a variable resistor 236 which is connected in series with resistors 238 and 240 is compared with the voltage at the output of the section associated with secondary winding 204. As is stated in the legend, the voltage taken via a tap at resistor 236 is the speed regulation adjustment voltage. This voltage is adjusted to provide the desired rate of change with speed of the turbine shaft in accordance with the requirements of the speed load regulation for the turbine and its shaft load.

The section associated with secondary winding portion 208 produces a D.C. output voltage whose amplitude is independent of the amplitude and frequency of the voltage produced by permanent magnet generator 62 above a given r.p.m. value, such independence being effective at a voltage level which is at least slightly less than the level produced at a chosen value such as say 3000 r.p.m. In this section, the voltage appearing across secondary winding portion 208 is rectified in rectifier 242 and is filtered in series connected inductor 244 and parallel connected capacitor 246. The output is developed across the series combination comprising a resistor 252, a variable resistor 254 and a resistor 256. The bank of diodes generally designated by numerals 258 and 260 respectively are of the Zener type and provide proper desired voltage regulation and compensation for temperature effects. Resistors 248 and 250 are source impedances for the banks of Zener diodes respectively. The regulated bias adjustment voltage taken from resistor 254 is chosen to have a value such that zero voltage appears across the contacts of SCT–1 when the speed is at for instance 3000 r.p.m. and the impending closure of contacts SCT–1 is about to be attained.

To understand the operation of the circuit of FIGS. 8–10 to the extent that it has been described, it is seen that the voltage appearing at point 213 in the circuit tends to increase substantially linearly in the negative direction as the amplitude of the voltage produced by the permanent magnet generator increases. When this voltage is combined with the voltage provided from variable resistor 236, a voltage is produced which decreases from a maximum point to a minimum point across the operating range of the turbine, the zero crossover point being chosen to be substantially at the desired normal operating point in the frequency range such as about 3600 r.p.m. Now, by adding the substantially constant negative voltage provided at variable resistor 254, the aforesaid zero crossover point is moved to the 3000 r.p.m. point.

Also provided in the circuit of FIGS. 8–10 is an arrangement for providing an adjustable voltage derived from regulated D.C. sources 108 and 110 (FIGS. 3–5). This circuit comprises a resistor 258, a variable resistor 260 connected in series with the positive terminal of source 108, and a parallel connected resistor 262. Variable resistor 260 corresponds to the high speed level set potentiometer shown in FIGS. 3–5 as controlled by knob 114. The desired voltage may be taken by a tap from a variable resistor 264. The value of the voltage provided from variable resistor 254 and the value of resistor 266 are so chosen that when contacts SCT–1 close due to the energization of relay SCT (it is energized when the turbine attains a speed of say 3000 r.p.m.), there is no voltage difference across these contacts. Resistor 264 is controlled by knobs 116 (FIGS. 3–5) and provides the adjustable reference indicating desired operating speed.

The voltage applied through closed contacts SCT–1, i.e., the voltage developed at resistor 264 minus the voltage drop across resistor 266 is applied through a resistor 268 and appears at the anode of a diode 270, diode 270 being connected to common through a tap on a variable resistor 272 and a resistor 274. One terminal of resistor 272 is connected to the positive D.C. source 108 through a resistor 276 and its other terminal is connected to the negative D.C. source through a resistor 278. As legended, the cathode of diode 270 is connected to the load limit indicator circuit and resistor 272 is controlled by load limit set dial shown as knob 112 in FIGS. 3–5. Resistors 272 may be set to a desired value by such knob and diode 270 limits the voltage appearing at its anode to that value. The load limit trigger circuit is explained hereinbelow.

A diode 280 has its anode connected to common by a tap on a variable resistor 282 and is connected through such tap and a resistor 284 to negative D.C. source 110. Diode 280 is included to insure that no negative voltage appears at the output of the circuit, the voltage appearing at the tap on resistor 282 being chosen for this purpose. Capacitor 283 serves as a noise filter.

It is seen that the circuit of FIGS. 8–10 provides a D.C. voltage having an amplitude proportional to desired speed and, to change from desired speed. By means of diode 270, an upper limit is placed on such voltage and with diode 280, there is insured that no negative voltage appears at the output. The arrangement whereby there is substantially no voltage across contacts SCT-1 when they close (when the system is switched from auxiliary power to the power provided by permanent magnet generator 62) serves to substantially minimize the possibility of an undesirable "step" (jump in the position of the valve during starting conditions when there is no load on the turbine shaft).

*Power Switching Circuit (FIG. 11)*

Reference is now made to FIG. 11 which is a schematic diagram of a circuit suitable for use as power switching stage 106 of FIGS. 3–5.

In this circuit, a transistor 300 has its emitter 302 connected to common and its collector 304 connected to one of a pair of normally open contacts CF2 associated with the circuit fault relay CF (not shown) through a resistor 306, the other of the pair of contacts being connected to regulated positive D.C. voltage supply 108. The base 308 of transistor 300 is connected to common through the parallel arrangement of oppositely poled diodes 310 and 312 and a resistor 314 and to contacts CF2 through the junction of diodes 310 and 312 and a resistor 316. Collector 304 is directly connected to the base 318 of a transistor 320.

The emitter 322 of transistor 320 is connected to common through a voltage divider arrangement comprising resistors 324 and 326, base 308 being connected to the junction of resistors 324 and 326 through a resistor 328. The collector 330 is connected to contacts CF2 through the parallel combination of a capacitor 332 and the series arrangement of the coil of a relay CP (Control Power) and a resistor 334, a diode 336 being provided across the coil of relay CP and poled as shown.

Connected to contacts CF2 is a source 338 of alternating current potential which may have a frequency of 60 c.p.s. and a voltage of 24 volts, such potential suitably being provided from the stepped down output of a line voltage source, one terminal of source 338 being grounded. In series connection with the other terminal of source 338 is a forward biased diode 340, a resistor 342, and the normally closed contacts CF1 of the circuit fault relay CF. The junction of resistor 342 and contacts CF1 is connected to common through a capacitor 344.

The output of permanent magnet generator 62 (FIGS. 3–5) is applied to the primary winding 348 of a transformer 346. Connected across the secondary winding 350 of transformer 346 is a series arrangement of a resistor 352 and a variable resistor 354. A capacitor 356 is also connected across secondary winding 350, a forward biased diode 358 being provided between the upper terminal of secondary winding 350 and resistor 352. A tap on a point on resistor 354 is connected to base 308 of transistor 300 through the series arrangement of a parallel combination comprising a resistor 360, the normally closed contacts CP1 of the control power relay CP, and a resistor 364.

Considering the operation of the circuit of FIG. 11, in its quiescent state, i.e. with the turbine not in motion, the 60 cycle voltage from source 338 is half-wave rectified through diode 340, filtered by capacitor 344 and applied through normally closed contacts CF1 as an operating biasing voltage to transistors 300 and 320. Consequently, transistors 300 and 320 are actuated into conduction and current flows therethrough whereby relay CP is energized. Such energization causes the closing of normally open contacts CP2 whereby an auxiliary power supply 362 is enabled to energize relay CPX, supply 362 suitably being a 115 volt, 60 cycle line voltage source. This 115 volt supply can now be utilized to actuate the electronic system.

Relay CF (not shown) is connected in circuit with regulated positive voltage supply source 108 and common. In the event that alternating current potential is being supplied to sources 108 and 110 wherein the regulated D.C. outputs are provided therefrom, then contacts CF1 open and contacts CF2 close whereby transistors 300 and 320 are connected to source 108. Thus, the circuit fault relay CF enables the sensing as to whether there is an output from source 108.

With the energization of relay CPX, the auxiliary A.C. power can be utilized as the A.C. power supply source for D.C. power source 108 to effect the energization of the circuit fault relay.

Now, as the turbine shaft is caused to rotate and the speed thereof is brought up, there is applied to the base 308 of transistor 300 at a given point in the speed buildup such as at about 3000 r.p.m., a positive voltage of an amplitude whereby the current in transistor 300 is sufficiently enhanced to reduce the current in transistor 320 sufficiently to effect the deenergization of relay CP. In this situation, the contacts of relay CP assume their normal positions. Consequently, relay CPX is also deenergized with its contacts also assuming their normal positions and the output of permanent magnet generator 62 functions as the A.C. power source for regulated D.C. source 108.

In the circuit of FIG. 11, when relay CP is energized, contacts CP1 thereof open thereby affecting the gain of transistors 300 and 320 so as to reduce the net positive increment of voltage required to cause the deenergization of relay CP. This is done to minimize the spread in turbine speed required to reduce pull-in and drop-out current in relay coil CP. Capacitor 332 is included to minimize relay CP "chatter" during turn on and turn off periods. Diode 336 is included to protect transistor 320 from inductive transients produced by the relay coil CP.

Accordingly, it is to be noted that with the circuit of FIG. 11, there is enabled the utilizing of readily available line power to actuate the electrical system in the event that the turbine is not in motion. It is to be further noted that, during the normal operation, i.e., with the turbine rotating at a sufficient speed, relay CP is in the unenergized state. Thus, during such normal mode of operation, malfunction of relay CP cannot affect the functioning of the system.

Diodes 310 and 312 are included as a protective arrangement to clamp the positive and negative excursions of the voltage appearing at base 308 to chosen values, viz., the forward drops of the diodes respectively.

Regulated negative supply source 110 (FIGS. 3–5) is provided at the time that the positive source 108 is switched into the circuit, the contacts of relay CPX effecting the transfer of operation from 60 cycle auxiliary power to the permanent magnet generator whereby, for steady state operation, negative and positive operating biasing potentials may be provided in the system.

*Load Limit Trigger (FIG. 12)*

The circuit schematically depicted in FIG. 12 is utilized to indicate whether diode 270 of FIGS. 8–10 is actually limiting, i.e., the voltage appearing at its anode is at least substantially equal to the voltage at the tapped point on variable resistor 272.

Accordingly, the voltage at the cathode of diode 270 (FIGS. 8–10) is applied to the base 372 of transistor 370 through a variable resistor 374 which is adjusted to effect a net gain of unity in transistors 370 and 394. The voltage input to base 372 is developed across a resistor 376. The collector electrode 378 is connected to D.C. source 380 through a resistor 382 and the emitter 384 is connected to a negative D.C. source 386 through a resistor 388 and a variable resistor 390. A resistor 392 is included between resistor 390 and common to provide a suitable negative bias at the junction 389 of resistor 388 and resistor 390.

The voltage appearing at collector 378 is directly applied to the base 396 of a transistor 394 which is connected as an emitter follower. In transistor 394, the collector 398 is directly connected to source 380 and the emitter 400 is connected to negative source 386 through the series combination of a resistor 402, a variable resistor 404 and a resistor 406. The tap on resistor 404 is set such that with zero volt input to base 372, there is zero volt output at resistor 404.

The voltage from resistor 404 is applied through a resistor 408 and across a resistor 410. Parallel connected capacitor 412 is included for filtering purposes.

The voltage appearing at the anode of diode 270 in FIGS. 8–10 is applied through a resistor 414, the latter resistor having the same value as resistor 408, to the junction 409 of resistors 408 and 410.

Since the combination of transistors 370 and 394 causes a 180° phase reversal in the signal applied thereto whereby the positive input voltage is a negative output voltage, in the event that diode 270 is performing a limiting function, the voltage at junction 409 is substantially zero plus whatever forward drop there is across diode 270. However, in the event that the voltage at the anode of diode 270 is less than the limiting voltage, the voltage appearing at junction 409 is negative.

The remainder of the circuit comprises three NPN transistors connected in cascade. It is seen that in the event that the voltage at junction 409 is negative, the conduction in the second transistor is increased and the conduction in the input and output transistors is decreased. The values of the circuit components are so chosen whereby, if diode 270 is performing a limiting function, a relay is energized to cause the closing of contacts associated therewith whereby an indicating lamp is connected in circuit with a voltage source and is illuminated.

In this portion of the circuit, the base 416 of a transistor 414 is connected to common through a variable resistor 418, a resistor 420 and a resistor 422. The emitter 424 is connected to common through the cathode to anode path of a diode 426, diode 426 serving to clamp the potential at emitter 414 to a negative potential equal to the forward drop of this diode. Diode 426 is chosen to have a temperature coefficient substantially equal to the temperature coefficient of the base emitter junction of transistor 414 thereby substantially compensating for temperature variations in this junction. Emitter 424 is connected to negative source 386 through the series arrangement of a resistor 428 and a variable resistor 430. The collector 432 is connected to the positive source 380 through a resistor 434 and a resistor 436. A feedback capacitor 438 is included to limit the high frequency response to undesirable noise voltages.

The output at collector 432 is directly applied to the base 440 of a transistor 438, the collector 442 of transistor 438 being connected to the junction 435 of resistors 434 and 436 through a resistor 444, and the emitter 446 being connected to common through resistor 422.

The output at collector 442 is applied directly to the base 450 of an output transistor 448. The emitter 452 of transistor 448 is connected to common through the series combination of a resistor 454 and the cathode to anode path of a diode 456, the junction 455 of diode 456 and resistor 454 being connected to source 380 through a resistor 458. Diode 456 is a Zener diode for regulating the emitter 452 bias voltage. The collector 460 of transistor 448 is connected to source 380 through the anode to cathode path of a diode 462 and a resistor 464. The coil 466 of a relay is connected across diode 462, contacts 468 being closed upon the actuation of coil 466 to place indicating light 470 in circuit with potential source 472. Diode 462 is provided to minimize the effects caused by inductive transients on transistor 448 as produced by coil 466. The bank of diodes generally designated by numeral 474 are included to regulate the voltage at junction point 435, i.e., to insure that it does not rise above a chosen level.

*Pressure Transducer Balance, A.C. Amplifier, Demodulator and Pressure Set Circuit (FIG. 13)*

In the circuit of FIG. 13 the output from oscillator 126 (FIGS. 3–5) is applied across a resistor 480 and through a resistor 482 to the primary winding 486 of a differential transformer 484. Connected between the upper terminals of secondary windings 488 and 490 is the series arrangement of a resistor 492, a variable resistor 494 and a resistor 496, the upper terminal of winding 490 being connected to common, the lower terminals of windings 488 and 490 being connected together by a tap to a point on variable resistor 494. Provided in transformer 484 is a movable magnetic core 485 whose position may be varied in response to the pressure applied to a pressure sensitive device such as a Bourdon tube (not shown), the signal induced by primary winding 486 in the secondary windings depending upon the position of the core. A null at a desired pressure is obtained by a mechanical adjustment of core 485 of transformer 484 at its mechanical attachment to the Bourdon tube, the core being preferably symmetrically disposed between windings 488 and 490. Variable resistor 494 permits a fine adjustment for minimizing the null voltage at such null pressure (voltages introduced by phase effects).

The signal appearing at junction 491 is applied to a transistorized bandpass. A.C. amplifier 497 having a bandpass frequency characteristic for the band of frequencies included between a frequency a few hundred cycles less than the frequency of oscillator 126 and a few hundred cycles greater than the frequency of oscillator 126.

The output from A.C. amplifier 497 is applied to the emitter 504 of a transistor 502 through a series connected capacitor 498 and a resistor 500. The output from square wave generator 126 is applied to the base 506 of transistor 502 through a capacitor 508 and a resistor 510, the junction of resistor 510 and capacitor 508 being connected to common through a resistor 512.

It is seen that transistor 502 is connected so as to provide inverted operation if the input to emitter 504 is sufficiently low, say about 0.1 volt or less. Thus, at such or lower voltages, transistor 502 is conductive whether the voltage applied to emitter 504 is negative or positive. Above such low voltage values, transistor 502 functions in the normal NPN mode of operation whereby transistor 502 is conductive when base 506 is positive with respect to emitter 504. To understand the operation of transistor 502, it is to be realized that at this point in the circuit, it is desired to chop negative voltages when the phases of the square wave and the amplified A.C. voltage are the same, such common phase relationship being chosen to occur at pressures less than the null pressure as determined by the transducer balancing arrangement.

The output at emitter 504 is applied through a series connected resistor 514 and filtered by parallel connected capacitors 516 and 518 to provide a unidirectional potential output reflecting the unidirectional potential component of the positive values of the A.C. output of amplifier 497. The output of the circuit is applied as a first input to pressure summer 134 (FIGS. 3–5).

The circuit of FIG. 13 accordingly provides a unidirectional potential proportional to the drop in pressure from a given base pressure.

In FIG. 13, there is also shown the arrangement for providing a signal representing a desired pressure level. This arrangement includes a series arrangement of a variable resistor 520 controlled by knob 132 in FIGS. 3–5 and a resistor 522 connected between common and negative source 524. The voltage is taken from resistor 520 by a tap and is applied as a second input to pressure summer 134.

*Operational Summing Amplifier (FIG. 14)*

In FIG. 14 there is shown a block diagram of the operational summing amplifier suitable for use in the system of this invention. The active elements in the depicted blocks are suitably of the transistor type.

In such amplifier, there is provided an adder network as disclosed in the block diagram depicted in FIG. 15.

In FIG. 15, a plurality of inputs, designated for convenience as input Nos. 1, 2 and 3 respectively, are combined in a passive network comprising resistors $R_1$, $R_2$ and $R_3$, the voltage resulting from such combination being applied as an input to a transistorized D.C. amplifier 526. Amplifier 526 is characterized by high gain and having a 180° phase reversal over a suitable useful frequency range. Connected across amplifier 526, i.e., between its input and output is a feedback resistor $R_f$. In the circuit of FIG. 15, with amplifier 526 chosen to have a very high gain, then the output voltage $$V_o = -\frac{R_f}{R_1}V_1 - \frac{R_f}{R_2}V_2 - \frac{R_f}{R_3}V_3$$

wherein $V_1$, $V_2$ and $V_3$ are the input voltages.

Referring back to FIG. 14, the output of a summing network 528 of a type shown in FIG. 15, is applied as one input to a differential amplifier 532 through an A.C. coupling network 530 which is suitably a blocking capacitor. The output of summing network 528 is also applied through a network comprising a chopper modulator 534, a transistorized A.C. amplifier 536 and a chopper demodulator 538, a square wave oscillator 540 being provided, the output of which is applied as an input to modulator 534 and demodulator 538 respectively. In differential amplifier 532, which is chosen to be of the single ended output type, there are combined and amplified the output from the A.C. coupling network 530 which comprises the high frequency components of the output of summing network 528 and the output of the chopper demodulator 538 which comprises the D.C. and low frequency components of the output of summing network 528. The output of differential amplifier 532 is an amplified replica of the output of summing network 528.

The output of differential amplifier 532 is applied to a D.C. power amplifier 542. The output of D.C. power amplifier 542 is fed back to the input of the feedback resistor $R_f$ as depicted in FIG. 15.

Typically, the values of the circuit components comprising the operational amplifier of this system are chosen so as to provide an output voltage proportional to the negative algebraic sum of the input voltages and having a numerical output value within the range of either plus or minus five volts.

*$V_1$ Summer (FIG. 16)*

In the circuit of FIG. 16, the output from the speed sensing circuit 104 (FIGS. 3–5) is applied as input No. 1 to an adder network and the output from the $V_1$ extraction summer 138 is applied as input No. 2 thereto.

The output from the speed sensing circuit is applied through a resistor 544 and developed across the series combination of a variable resistor 546 and a resistor 548 to common. The voltage taken from a tap on resistor 546 is applied as an input to a D.C. amplifier 550 through a resistor 552 and the output from the $V_1$ extraction summer circuit 138 is applied as an input to amplifier 550 through a series arrangement of variable resistor 554 and a resistor 556. Amplifier 550 is a high gain D.C. amplifier which provides a 180° phase shift between input and output voltages. The parallel combination of a capacitor 558 and a resistor 560 is connected between the input and the output of the amplifier. The values of the resistors in the circuit FIG. 16 are so chosen whereby there is provided at the output of amplifier 550, a unidirectional potential proportional to the sum of the speed signal and the output of the $V_1$ extraction summer. The value of capacitor 558 is chosen to limit the net frequency response to only those high frequencies necessary to faithfully reproduce significant transient information, i.e., rates of response for control response, such value preferably being one where the response is no higher than a value such as about 100 c.p.s. to minimize the influence of circuit noise, etc. The values of the resistors are so chosen whereby the net summing gain of the circuit is such that the movements of the inlet valve are influenced in a proportional manner in response to changes in speed and pressure. The specific gain values are determined by the particular design of the turbine, mechanical advantage between ram motion and steam valve lift, and desired speed and pressure regulation. For a chosen turbine design, a desirable gain may fall in the range of .5 to 2.

*Pressure Summer (FIG. 17)*

In the circuit of FIG. 17, one input thereto, viz., input No. 1 is the output from pressure demodulator (FIG. 13) at junction 515 thereat and the other input (input No. 2) is the output from the pressure level set potentiometer 520 FIG. 13.

The output from the pressure demodulator is applied through series connected variable resistor 562 and a resistor 564 to the input of amplifier 566, the junction 563 of resistors 562 and 564 being connected to common through a resistor 568.

The output from the pressure level set potentiometer is applied as an input to amplifier 566 through a resistor 570. Connected between the input and output of amplifier 566, which is chosen to be a D.C. amplifier having a high gain and a 180° phase shift, is the parallel combination of a capacitor 572 and a variable resistor 574. Connected between the output and input of amplifier 566 is the anode to cathode path of a diode 576.

A third input to amplifier 566 is the voltage obtained by the tap on the flow limit set potentiometer controlled by knob 140 (FIGS. 3–5), a variable resistor located in adjusting network 136, as will be further explained. This input is applied through the cathode to anode path of a diode 578.

The output of amplifier 566 provides two inputs to the adjusting network 136 as will be further explained hereinbelow.

With regard to input No. 1 to the pressure summer, potentiometer 562 provides an adjustment in the summing gain for input No. 1. The values for resistors 564 and 568 are chosen so as to satisfy the requirement for the magnitude of the desired summing gain and the discharge time constant resulting from their combination with filter capacitors 516 and 518 of the pressure demodulator (FIG. 13). The selected gain results from the consideration of a particular design of a turbine. With regard to input No. 2, the value of resistor 570 is so chosen as to provide a selected gain for input No. 2.

In the parallel combination shunting amplifier 566, variable resistor 574 is chosen to have a value whereby there is permitted an adjustment for the summing gain for both inputs No. 1 and No. 2 in accordance with the equation set forth in connection with the description of the summing amplifier of FIG. 15. Capacitor 572 is chosen to have a value so as to provide a high frequency response such that those frequency components required for control purposes are passed with substantially no attenuation. Typically, such high frequency response may be limited to 100 c.p.s.

Diode 576 is included to provide a limiting action such that substantially no positive output will be passed to the output of the amplifier. Diode 578 in combination with the flow limit potentiometer is included to provide an adjustable limit to the negative output voltage. Accordingly, at the output of the output of the circuit, there is provided a negative voltage proportional to the negative of the algebraic sum (amplifier 566 produces 180° phase shift) of voltages proportional to the voltages applied at inputs Nos. 1 and 2.

Typically, the summing gain for either input of the output of amplifier 566 is in the range of one to three depending upon a particular turbine design.

Adjusting Network (FIG. 18)

In the circuit of FIG. 18, the output of pressure summer (FIG. 17) is applied through a potentiometer 580 as a first input to the $V_1$ extraction summer 138 (FIGS. 3–5), and as a second input to the $V_2$ summer 150 (FIGS. 3–5). This output is also applied together with a regulated D.C. voltage existing at point 585 from a regulated voltage source 592 through a resistor 582 (the flow limit set potentiometer controlled by knob 140 of FIGS. 3–5). The voltage existing at a point on variable resistor 582 is applied as the No. 3 input to pressure summer 134 via a tap. Connected between point 585 and common is a variable resistor 586, a resistor 588, a variable resistor 590 and a resistor 594. Potentiometers 580 and 590 mechanically attached to knob 142 (FIGS. 3–5) are ganged so that adjustment of one results in a corresponding adjustment in the other.

The setting on flow limit set potentiometer 582 provides reverse bias voltage as has previously been described in connection with the description of the operation of the pressure summer 134 (FIGS. 3–5).

Resistor 580, variable resistor 590 and resistor 594 have values chosen so that together with the adjusted value chosen for variable resistor 586, the potential existing at the tap of potentiometer 590 and applied as the No. 3 input to the $V_2$ summer 150 produces the desired index or lead position of the extraction valve $V_2$ relative to the inlet valve. The value of variable resistor 590 is so chosen that the voltage representing the designed index or lead position occurs therein between points 589 and 591.

To permit economy operation, i.e., minimum throttling losses due to fluid flow through the extraction valve $V_2$ when no steam is being provided through the extraction conduit ("straight condensing operation"), provision is made for sufficiently opening the extraction valve to a position in accordance with a particular design whereby there results a negligible pressure drop across the extraction valve. Accordingly, if the tap on variable resistor 590 is at point 595 and in accordance with the chosen value of resistor 590 as set forth hereinabove, the voltage appearing at point 595 has a value which represents a position of the extraction valve corresponding to the necessary position for such economy operation. Of course, the value of resistor 590 is chosen relative to the value of resistor 594 to effect these results. Their ratio is substantially equal to the ratio of the index position degree of opening and the economy operation degree of opening of the extraction valve.

It is noted in FIG. 18 that potentiometers 580 (pressure governor) and 590 (in-out economy) are ganged. With regard to potentiometer 580, when the tap is at points 583 and 585, the inputs to the $V_1$ extraction summer and $V_2$ summer are respectively at common potential. When the tap is at point 581, the inputs to the $V_1$ extraction summer and $V_2$ summer respectively are the full output of the pressure summer. The rotational characteristics of potentiometer 580 and 590 are so chosen that when the tap of potentiometer 580 is moved to point 581, the tap on potentiometer 590 is moved to point 591. With this arrangement, there is effected the utilization of the full pressure adjusting signal for control of the turbine extraction opening pressure, the appropriate indexing of the extraction valve being effected by the concurrent position of the tap of potentiometer 590 at point 591. When the tap on potentiometer 580 is placed at point 583, the inputs to the $V_1$ and $V_2$ summers are at common potential whereby no pressure control signal is utilized. Concurrently, the tap on potentiometer 590 is mechanically positioned at point 589, and the extraction valve is accordingly still at the desired index position. Now, when the tap on potentiometer 580 is moved to point 585, here again, the inputs to the $V_1$ extraction summer and $V_2$ summers are at common potential but the tap on potentiometer 590 has been moved simultaneously to point 595 to effect economy operation as hereinabove explained.

It is to be noted that arrangement of potentiometers 580 and 590 provides a means for insuring that pressure control and economy operation cannot occur simultaneously as well as for insuring a smooth transition devoid of undesirable transients when a change is made from economy to pressure control operation. Conveniently, the midpoint positions for both potentiometers are utilized when the turbine is started up.

$V_1$ Extraction Summer (FIG. 19)

In the circuit of FIG. 19, the pressure signal from the extraction limiting gating network stage 152 (FIGS. 3–5) is applied as an input to an operational amplifier 596 through the series arrangement of variable resistors 598 and 600 and a resistor 602. The other input to amplifier 596 is from adjusting network 136 (FIGS. 3–5) and is applied as an input to amplifier 596 through the series combination of a variable resistor 604 and a resistor 606.

Amplifier 596 is a D.C. amplifier having a 180° phase shift and has connected between its input and output, the parallel combination of a resistor 608 and a capacitor 610.

The output of amplifier 596 is applied as a second input to the $V_1$ summer (FIGS. 3–5 and FIG. 16).

The values of the resistors in the circuit of FIG. 16 are so chosen whereby there is provided at the output of amplifier 596 a unidirectional potential proportional to the sum of the pressure signal and the output of the $V_2$ summer as modified by the action of extraction limiting gating stage 152. The value of capacitor 610 is chosen to limit the net frequency response to only those high frequencies necessary to faithfully reproduce sginificant transient information, i.e., rates of response for control response, such value preferably being one where the response is no higher than a value such as about 100 c.p.s. The value of resistor 608 is chosen to have a value whereby there is effected an adjustment of the summing gain for both inputs Nos. 1 and 2 in accordance with the equation set forth in connection with the description of the summing amplifier of FIG. 15.

$V_2$ Summer (FIG. 20)

In the circuit of FIG. 20, the speed-load signal, i.e., the output of the speed sensing and adjusting stage 104 (FIGS. 3–5), as hereinabove explained, is applied as a first input to D.C. amplifier 612 through the series combination of a variable resistor 614 and a resistor 616. A second input to amplifier 612 is the pressure control signal from adjusting network (FIG. 8, resistor 580) which is applied to amplifier 612 through the series combination of a variable resistor 618 and a resistor 620. A third input is applied to amplifier 612 through a resistor 622, the latter input being the voltage taken from variable resistor 590 in the adjusting network (FIG. 18).

Amplifier 612 is a high gain D.C. amplifier which provides an output signal 180° out of phase with the input signal. Connected between the input and output of amplifier 612 is parallel combination of a capacitor 624 and a resistor 626. The output of amplifier 612 is applied as an input to extraction limiting gating network 152.

With regard to the values of the resistors and the capacitor in the circuit, they are chosen to provide proper summing gain values and desirable frequency response characteristics respectively. Such values are determined for reasons similar to those which determine the values of the circuit components of the $V_1$ summer, the $V_1$ extraction summer and the pressure summer as hereinabove explained.

Extraction Limiting Gating Network (FIG. 21)

In the circuit of FIG. 21, the output of the $V_2$ summer 150 (FIGS. 3–5) is applied through a series connected resistor 630 and across a series combination of a resistor 632 and a portion of a variable resistor 636, one terminal of resistor 636 being connected to common, the other terminal being connected to a source of positive potential 640 through a resistor 638.

Contacts SCT-2 of relay SCT are normally open. It is seen in FIG. 22 that when contacts CPX close due to the actuation of relay CP, the coil of relay SCT is actuated whereby contacts SCT-2 close to short circuit the voltage appearing at point 631 to common. In this situation, one terminal of relay SCT is connected to a source of positive potential 634 and its other terminal is connected to common through a resistor 642.

When relay XL is unenergized (FIG. 24), normally closed contacts XL-2 thereof cause point 631 to be shorted to common. However, with the actuation of relay XL, contacts XL-2 open and, if contacts SCT-2 are also open, the output from the $V_2$ summer is applied as an input to the $V_1$ extraction summer.

In FIG. 23, it is seen that when relay SCT is energized, the normally closed contacts SCT-1 thereof open and then close when the turbine attains a chosen speed as explained in connection with the circuit of FIGS. 6-8 (speed sensing and adjusting stage 104).

As previously explained, in connection with power switching stage 106, relay CPX is in the energized state during those times that the turbine shaft is rotating at speeds below a chosen value such as, say, 3000 r.p.m. Accordingly, relay SCT is also energized and its contacts SCT-2 are closed during such times. Contacts SCT-1 are open during such times and revert to their normally closed position above the chosen turbine speed when relay CPX is deenergized.

It is seen that the circuit of FIG. 21 permits four conditions of operation. The first and second conditions occur during those times when turbine shaft speed is below the chosen level such as the 3000 r.p.m. figure aforestated. In the first and second conditions, relay SCT is energized and contacts SCT-2 are closed. Accordingly, the input No. 2 to the $V_1$ extraction summer is at common potential irrespective as to whether or not relay XL is energized (i.e., the extraction limit trigger circuit is or is not enabled). Thus, there is permitted normal start-up operation with desired movements of both the inlet and extraction valves being made possible at their normal rates of travel, the speed load control potentiometer controlled by knob 116 influencing their positions such as is required for start-up operation.

In the third and fourth conditions which occur when the turbine shaft has attained a speed at least equal to the aforesaid chosen speed, relay SCT is deenergized and its contacts SCT-2 are in their normally open position. If the condition which exists when relay XL is not energized is designated the third condition, i.e., the extraction limit trigger circuit is not enabled, the No. 2 input to $V_1$ extraction summer is at common potential. This third condition therefore signifies that the turbine is capable of operating under speed and pressure control and fulfilling the requirements for desired speed load and pressure flow regulation.

In the fourth condition, wherein contacts SCT-2 and XL-2 are both open, i.e., the extraction limit trigger stage 154 is enabled, during times of shaft speed above the chosen speed, the voltage at point 631 is applied as an input to input No. 2 of the $V_1$ extraction summer, i.e., the output from the $V_2$ summer as limited by the resistors and voltage sources in the circuit.

The values of resistors 630 and 632, the setting on variable resistor 636 and the value of resistor 640 are so chosen that the voltage developed at point 631 is at common potential when the extraction valve is on the verge of the closed position. Thus, the combination of these resistors provides a voltage which counteracts the voltage introduced into the output of the $V_2$ summer by the setting of the $V_2$ summer lead set potentiometer plus the voltage which represents the distance traveled by the hydraulic ram for the extraction valve from the initial indexed position to the valve's verging on closure position. By this arrangement, there is insured a zero voltage at point 631 when the extraction valve is just on the verge of closing. Zero voltage, of course, is needed at the latter position of the extraction valve since at this point it is the transition between normal operation and the need for error signals to be applied to the $V_1$ extraction summer. Since the net sum of the components of the output of the $V_2$ summer representing these positions is a negative voltage, the counteracting voltage is of necessity a positive voltage.

Depending upon the particular design of a turbine valve construction, the index position may be either a lead or a lag from the impending opening or verge of closure position of the extraction valve. It is, accordingly, to be realized that this system contemplates application in either type of situation, i.e., whether the design of the valve includes either such lead or lag.

The system of this invention and particularly the circuit of FIG. 21 has been described to operate associatively with a turbine wherein operation can proceed with the extraction valve in a completely closed position. However, in those turbines in which it is necessary to insure that the extraction valve does not assume a position during operation which is more than the verge of closing position, the so-called "not cracking" position, i.e., the extraction valve must always be open at least a trifle. The values of the components of the circuit of FIG. 21 and the time that the extraction limit trigger is chosen to be enabled can be readily varied to insure that such trigger is enabled only when the extraction valve is at least in the "not cracking position."

*Extraction Limit Trigger Circuit (FIG. 24)*

In the circuit of FIG. 24, the output from the A.C. amplifier of the amplifier demodulator stage 176 in the extraction valve $V_2$ servo loop, which is the amplified output of feedback transducer 174, is applied to the base 641 of a transistor 645 through the series combination of a variable resistor 644, a capacitor 646 and a resistor 648. In transistor 645, base 641 is connected to common through a resistor 650 and to a source of positive potential 652 through resistors 654, 656 and 658. The emitter 660 is connected to common through a resistor 662 shunted by a capacitor 664 and a resistor 666. The collector 668 is connected to the junction 657 of resistors 656 and 658. The output at collector 668 is applied to the base 674 of a transistor 672 through a capacitor 670. Junction 655 is connected to common through a capacitor 653 to eliminate A.C. feedback.

In transistor 672, base 674 is connected to source 652 through resistors 676, 678, and 680, the junction 677 of resistors 676 and 678 being connected to common through a capacitor 682 to eliminate A.C. feedback. The emitter 684 is connected to common through a resistor 686 bypassed by a capacitor 688 and the collector 690 is connected to the junction 679 of resistors 678 and 680. The output at collector 690 is applied to the base 694 of a transistor 692 connected as an emitter follower.

In transistor 692, the collector 696 is directly connected to source 652 and the emitter 698 is connected to common through a resistor 700. Emitter 698 is connected to the junction 665 of resistors 662 and 666 through a variable resistor 702, a resistor 704 and a capacitor 706 to provide A.C. negative feedback. The latter is to provide A.C. gain substantially independent of transistor parameter variations. The emitter follower stage comprising transistor 692 provides impedance isolation.

The output at emitter 698 is applied to a full-wave rectifier 708 comprising diodes 710, 712, 714, and 716 through a capacitor 720. The junction of diodes 712 and 714 is connected to common through a capacitor 722 and the junction of diodes 710 and 712 is connected to common through a capacitor 724. The junction of diodes 714 and 716 is connected to common through a resistor 726 and capacitor 724.

The unidirectional potential output from rectifier 708 is filtered in a filter comprising a series connected inductor 725 and the parallel connected series combination of a capacitor 728 and capacitor 724 and is referenced to the bias voltage appearing at the tap on variable resistor 736.

The output of the filter is applied to the base 732 of a transistor 730. In transistor 730, base 732 is connected to common through the series combination of a resistor 734, a portion of a variable resistor 736 and a resistor 738, the tap on variable resistor 736 also being connected to the junction 727 of capacitors 728 and 724. The emitter 740 is connected to common through a resistor 742 and the collector 744 is connected to source 652 through the series arrangement of the parallel combination of the coil of relay XL, the anode to cathode path of a diode 746, capacitor 748, and a resistor 750. The consequent actuation of relay XL causes the opening of normally closed contacts XL-2 in the extraction limiting gating network 152 (FIG. 21 and FIGS. 3–5) as previously explained.

It is seen that the circuit of FIG. 24 comprises an A.C. amplifier and an emitter follower which produces an A.C. voltage whose amplitude is proportional to the position of the $V_2$ extraction valve. The values of the components of the amplifier and emitter follower circuits are chosen so that there is provided a quite high gain and so that there is the aforesaid proportionality at all positions of the extraction valve which require the enabling of the extraction limiting gating circuit by the extraction limit trigger, viz., the positions included between the verge of closing and the completely closed positions. Hydraulic ram positions in excess of these positions will cause saturation conduction in the transistors 645 and 672. However, such saturation will not influence the remaining portion of the circuit from functioning in accordance with its purpose.

The A.C. signal from the emitter follower is converted to a negative D.C. voltage by a full wave rectifier and such D.C. voltage is compared with a positive D.C. voltage obtained from a potentiometer in a voltage divider network connected between a positive potential source and common.

The resulting difference voltage is applied as an input to a transistor relay amplifier. For sufficiently positive inputs to this relay amplifier, relay XL is energized. For negative inputs, relay XL is maintained in the unenergized state.

The positive reference voltage obtained from the potentiometer in the voltage divider network is chosen to have a value whereby a substantially positive input voltage to the relay amplifier results when the hydraulic ram is at that position such that it is desired to enable the extraction limit gating network. In other words, such positive voltage must exceed in value the negative voltage from the rectifier when the valve is at the verge of closing position.

In the event that relay XL is in the energized state, it is evident that a position more open than the verge of opening position of the extraction valve produces a negative voltage from the output of full-wave rectifier 708 to override the positive voltage taken from potentiometer 736 and relay XL is consequently deenergized, thus disabling extraction limiting gating circuit 152.

The high gain of the A.C. amplifier and the emitter follower are selected to insure that relay XL is energized and deenergized within such periods whereby the motions of the extraction valve corresponding to the quantities of "pull in" and "drop out" currents respectively of relay XL are confined to tolerable limits.

When a combination of conditions of operation obtain such as a combination of low extraction pressure and low load, i.e., the extraction limit trigger is enabled whereby it is impossible to regulate both speed and pressure (the design limits of the turbine are reached), the embodiment of this invention described hereinabove permits a preference for retaining speed control as against retaining pressure control. If it is desired to select pressure as the preferred control (in those cases where the turbine load is a generator connected to a large electric system and speed remains substantially constant but load on the generator is permitted to vary widely) there would be merely required a limiting gating arrangement as by stages 152 and 154 (FIGS. 3–5). However, the output of a summer such as the $V_1$ summer in this situation would be gated as an input into a summer such as the $V_1$ extraction summer and the output of the latter would be an additional input to the $V_2$ summer.

In the system as described, it is to be understood that the active elements, rectifiers, diodes, etc., which are utilized are of the semiconductor type such as transistors, etc. Those circuits which have not been described in detail are transistorized circuits well known in the art and their detailed description has been deemed unnecessary.

While there have been described what are considered to be the preferred embodiments of this invention, it will be obvious to those skilled in the art that various changes and modifications may be made therein without departing from the invention and it is, therefore, claimed in the appended claims to cover all such changes and modifications as fall within the spirit and scope of the invention.

What is claimed as new and desired to be secured by Letters Patent of the United States is:

1. In an elastic fluid multi-stage turbine which includes a rotatably mounted output shaft, an inlet valve governing the flow of fluid to the turbine, an extraction conduit connected to an intermediate stage of the turbine, and an extraction valve governing the proportion of fluid which flows from said intermediate stage to a succeeding stage of said turbine; the combination comprising means responsive to the speed of said output shaft for generating a first electric signal which is a function of said speed, means responsive to the pressure in said extraction conduit for generating a second electric signal which is a function of said pressure, means for modifying said first signal with said second signal, means for modifying said second signal with said first signal, the modified first signal controlling the position of the inlet valve, the modified second signal controlling the position of the extraction valve, gating means which is enabled in response to a selected position of one of said valves for counteracting the modification of one of said signals with the other of said signals whereby during the enabling of said gating means, the position of the other of said valves is controlled by said one of said signals unmodified by the other of said signals.

2. In an elastic fluid multi-stage turbine which includes a rotatably mounted output shaft, an inlet valve governing the flow of fluid to the turbine, an extraction valve governing the flow of elastic fluid from an intermediate stage to a succeeding stage of said turbine and an extraction conduit connected to an intermediate stage of said turbine; the combination comprising means responsive to the speed of said output shaft for generating a first electric signal which is a function of said speed, means responsive to the pressure in said extraction conduit for generating a second electric signal which is a function of said pressure, means for modifying said first signal with said second signal, means for modifying said second signal with said first signal, the modified first signal controlling the position of the inlet valve, the modified second signal controlling the position of the extraction valve, gating means which is enabled in response to a selected position of one of said valves for counteracting the modification of one of said signals with the other of said signals and for effecting modification of said one signal with said one signal whereby during the enabling of said gating means, the position of the other of said valves is controlled by said one of said signals further modified by said one of said signals.

3. In an elastic fluid multi-stage turbine which includes a rotatably mounted output shaft, an inlet valve governing the flow of elastic fluid to the turbine, an extraction valve governing the flow of elastic fluid from an intermediate stage to a succeeding stage of said turbine and an extraction conduit connected to an intermediate stage of said turbine; the combination comprising means responsive to the speed of said output shaft for generating a first electric signal which is a function of said speed, means responsive to the pressure in said extraction conduit for generating a second electric signal which is a function of said pressure, means for modifying said first signal with said second signal, means for modifying said second signal with said first signal, the modified first signal controlling the position of the inlet valve, the modified second signal controlling the position of the extraction valve, gating means which is enabled in response to a selected position of said extraction valve for counteracting the modification of said first signal with said second signal and for further modifying said first signal with said first signal whereby during the enabling of said gating means, the position of said inlet valve is controlled by said first signal as further modified by said first signal.

4. In an elastic fluid multi-stage turbine which includes a rotatably mounted output shaft, an inlet valve governing the flow of elastic fluid to the turbine, an extraction valve governing the flow of elastic fluid from an intermediate stage to a succeeding stage of said turbine, an extraction conduit connected to an intermediate stage of said turbine; the combination comprising means responsive to the speed of said output shaft for generating a first electric signal which is a function of said speed, means responsive to the pressure in said extraction conduit for generating a second electric signal which is a function of said pressure, means for modifying said first signal with said second signal, means for modifying said second signal with said first signal, the modified first signal controlling the position of the inlet valve, the modified second signal controlling the position of the extraction valve, means enabled in response to a selected position of said extraction valve, means responsive to the enabling of said extraction valve position responsive means for counteracting the modification of said first signal with said second signal and for further modifying said first signal with said first signal whereby during the enabling of said extraction valve position responsive means, the position of said inlet valve is controlled by said first signal as further modified by said first signal.

5. In an elastic fluid multi-stage turbine which includes a rotatably mounted output shaft, an inlet valve governing the flow of elastic fluid to the turbine, an extraction valve governing the flow of elastic fluid from an intermediate stage to a succeeding stage of said turbine and an extraction conduit connected to an intermediate stage of said turbine; the combination comprising means responsive to the speed of said output shaft for generating a first electric signal which is a function of said speed, means responsive to the pressure in said extraction conduit for generating a second electric signal which is a function of said pressure, means for modifying said first signal with said second signal, means for modifying said second signal with said first signal, the modified first signal controlling the position of said inlet valve, the modified second signal controlling the position of the extraction valve, means enabled in response to a selected position of said extraction valve, means responsive to the enabling of said extraction valve position responsive means for counteracting the modification of said first signal with said second signal and for further modifying said first signal with said first signal whereby during the enabling of said extraction valve position responsive means, the position of said inlet valve is controlled by said first signal as modified by said first signal, first correction means responsive to the amount of movement of said inlet valve from a chosen position and to said modified first signal for controlling the position of said inlet valve substantially independent of the strength and non-linearities of reaction forces on said inlet valve, and second correction means responsive to the degree of movement of said extraction valve from a chosen position and to said modified second signal for controlling the position of said extraction valve substantially independent of the strength and non-linearities of reaction forces on said extraction valve.

6. In the combination defined in claim 5 wherein said first and second correction means include respectively first and second transducer means for generating a voltage having an amplitude which is a function of the degree of movement of a valve from a chosen position.

7. In the combination defined in claim 6 wherein said first and second correction means includes third and fourth means respectively responsive to the outputs of said first and second voltage generating means for deriving respective first and second unidirectional potentials which represent the positions of said inlet and said extraction valve.

8. In the combination defined in claim 7 wherein there is included first summing means for algebraically adding said first modified signal and said first potential and second summing means for algebraically adding said second modified signal and said second potential.

9. In the combination defined in claim 8 wherein said first and second summing means, said first and second means for generating a voltage having an amplitude which is a function of the degree of movement of a valve from a chosen position, and said third and fourth means for deriving said respective first and second unidirectional potentials are included in first and second closed loops, said combination further including means for effecting stability of said closed loops.

10. In the combination defined in claim 9 wherein said phase shift correction means comprises first and second capacitors connected in parallel with the outputs of said third and fourth means for deriving said unidirectional potentials.

11. In the combination defined in claim 9 and further including fifth and sixth means for deriving third and fourth unidirectional potentials which are substantially proportional respectively to the instantaneous velocity of a valve and whose polarity is determined by the instantaneous direction of travel of a valve and wherein said first modified signal, said first unidirectional potential representing the position of said inlet valve and said third unidirectional potential representing the velocity of the valve are algebraically added in said first summing means and said second modified signal, said second unidirectional potential representing the position of said extraction valve, and said fourth unidirectional potential representing the velocity of said extraction valve are algebraically added in said second summing means, said means for deriving said potential responsive to the velocity of a valve providing stable operation of a closed loop with optimum response.

12. In the combination defined in claim 11 wherein said fifth and sixth means for deriving said first and second unidirectional potentials responsive to the velocity of said valves are linear velocity transducers.

13. In an elastic fluid multi-stage turbine which includes a rotatably mounted output shaft, an inlet valve governing the flow of elastic fluid to the turbine, an extraction valve governing the flow of elastic fluid from an intermediate stage to a succeeding stage of said turbine and an extraction conduit connected to an intermediate stage of said turbine; the combination comprising transducer means responsive to the speed of said output shaft for deriving an alternating current electric signal having an amplitude proportional to said speed, means responsive to the output of said transducer means for producing a first unidirectional potential signal proportional to a prescribed speed and change from such prescribed speed, means responsive to the pressure in said extraction conduit for generating a second electric signal which is a function of said pressure, means for modifying said first signal with said second signal, means for modifying said second signal with said first signal, the modified first signal controlling the position of said inlet valve, the modified second signal controlling the position of the extraction valve, means enabled in response to a selected position of said extraction valve, means responsive to the enabling of said extraction valve position responsive means for counteracting the modification of said first signal with said second signal and for further modifying said first signal with said first signal whereby, during the enabling of said extraction valve position responsive means, the position of said inlet valve is controlled by said first signal as modified by said first signal, first correction means responsive to the amount of movement of said inlet valve from a chosen position and to said modified first signal for controlling the position of said inlet valve substantially independent of the strength and non-linearities of reaction forces on said inlet valve, and second means responsive to the degree of movement of said extraction valve from a chosen position and to said modified second signal for controlling the position of said extraction valve substantially independent of the strength and non-linearities of reaction forces on said extraction valve.

14. In the combination defined in claim 13 wherein said transducer means comprises a permanent magnet generator having a selected number of pairs of poles, the frequency of the alternating current signal produced thereby being equal to the speed of said shaft multiplied by said number.

15. In the combination defined in claim 13 wherein said means for deriving said first unidirectional potential signal includes means for providing a voltage level having a value about which variations of turbine speed are referenced.

16. In the combination defined in claim 15 wherein said shaft includes a variable load and wherein said means for deriving said first unidirectional potential signal includes means for providing a voltage having a value which represents a maximum speed for said shaft in the absence of any load.

17. In the combination defined in claim 16 wherein said means for deriving said first unidirectional potential signal further includes means for providing a limiting voltage having a value which represents a maximum degree of opening permitted of said inlet valve and said extraction valve in response to shaft speed changes and load independent of the values of the voltage about which variations of turbine speed are referenced and the voltage representing said maximum speed in the absence of said load.

18. In the combination defined in claim 17 and further including means responsive to the output of said means for deriving said first unidirectional potential signal for indicating whether said output is at least equal to said limiting voltage.

19. In an elastic fluid multi-stage turbine which includes a rotatably mounted output shaft, an inlet valve governing the flow of elastic fluid to the turbine, an extraction valve governing the flow of elastic fluid from an intermediate stage to a succeeding stage of said turbine and an extraction conduit connected to an intermediate stage of said turbine; the combination comprising means responsive to the speed of said output shaft for generating a first electric signal which is a function of said speed, means responsive to the pressure in the extraction conduit for generating a second unidirectional potential signal proportional to the drop in pressure in said extraction conduit from a predetermined maximum pressure, means for modifying said first signal with said second signal, means for modifying said second signal with said first signal, the modified first signal controlling the position of said inlet valve, the modified second signal controlling the position of the extraction valve, means enabled in response to a selected position of said extraction valve, means responsive to the enabling of the extraction valve position responsive means for counteracting the modification of said first signal with said second signal and for further modifying said first signal with said first signal whereby during the enabling of said extraction valve position responsive means, the position of said inlet valve is controlled by said first signal as modified by said first signal, first correction means responsive to the amount of movement of said inlet valve from a chosen position and to said modified first signal for controlling the position of said inlet valve substantially independent of the strength and non-linearities of reaction forces on said inlet valve and second correction means responsive to the degree of movement of said extraction valve from a chosen position and to said modified second signal for controlling the position of said extraction valve substantially independent of the strength and non-linearities of reaction forces on said extraction valve.

20. In the combination defined in claim 19 wherein said means for generating said second unidirectional signal includes transducer means for providing an alternating current voltage having an amplitude proportional to the pressure in said extraction conduit, means for balancing the output of said transducer to a null voltage at said predetermined maximum pressure and for modulating the output of said transducer with a signal whose value is a function of the difference between said predetermined maximum pressure and the pressure in said extraction conduit, and means responsive to the output of said balancing and modulating means for producing a unidirectional potential which represents the deviation of the pressure in said extraction conduit from said maximum pressure.

21. In the combination defined in claim 20 wherein said means for generating said second unidirectional signal further includes means for providing a chosen reference voltage to determine at what pressure level in said extraction conduit said combination is to normally operate at, said chosen voltage not exceeding the voltage representing said predetermined maximum pressure.

22. In the combination defined in claim 21 and further including means for providing a flow limit voltage which represents a maximum flow of elastic fluid through said extraction conduit and summing means for algebraically adding the second unidirectional potential signal representing the deviation in pressure in said extraction conduit from said predetermined maximum pressure, said chosen reference voltage and said flow limit voltage, whereby the output of said summing means is a unidirectional potential which represents a deviation in pressure from said predetermined maximum pressure and a flow limit up to a chosen maximum.

23. In the combination defined in claim 22 wherein said summing means includes means which prevents the providing of an output from said summing means when the pressure in said extraction conduit exceeds said predetermined maximum pressure.

24. In the combination defined in claim 23 and further including indexing means for providing a voltage which represents a chosen initial position of the extraction valve relative to the position of the inlet valve.

25. In the combination defined in claim 24 and further including means for effecting operation with said extraction valve in a substantially completely open position whereby there is a negligible pressure drop across the extraction valve, said means including means for simultaneously actuating said indexing means to provide a voltage representing such opening position.

26. In an elastic fluid multi-stage turbine which includes a rotatably mounted output shaft, an inlet valve governing the flow of elastic fluid to the turbine, an extraction valve governing the flow of elastic fluid from an intermediate stage to a succeeding stage of said turbine and an extraction conduit connected to an intermediate stage of said turbine; the combination comprising means responsive to the speed of said output shaft for generating a first electric signal which is a function of said speed, means responsive to the pressure in said extraction conduit for generating a second signal which represents a deviation of said pressure from a chosen pressure, means for providing a voltage representing an initial position of said extraction valve with respect to said inlet valve, means for modifying said first signal with said second signal, means for modifying said second signal with said first signal, the modified first signal controlling the position of said inlet valve, the modified second signal controlling the position of the extraction valve, means enabled in response to a selected position of said extraction valve, means responsive to the enabling of the extraction valve position responsive means for counteracting the modification of said first signal with said second signal and for further modifying said first signal with said first signal whereby during the enabling of said extraction valve position responsive means, the position of said inlet valve is controlled by said first signal as modified by said first signal, first correction means responsive to the amount of movement of said inlet valve from a chosen position and to said modified first signal for controlling the position of said inlet valve substantially independent of the strength and non-linearities of reaction forces on said inlet valve, and second means responsive to the degree of movement of said extraction valve from a chosen position and to said modified second signal for controlling the position of said extraction valve substantially independent of the strength and non-linearities of reaction forces on said extraction valve.

27. In the combination defined in claim 26 wherein said means for modifying said first signal comprises first summing means wherein said first signal and said second signal are applied as inputs, and wherein said means for modifying said second signal includes second summing means wherein said first signal, said second signal and said voltage representing said initial position are applied as inputs.

28. In the combination defined in claim 26 wherein the output of said second summing means is applied as an input to said counteracting means, said counteracting means including means for cancelling the voltage representing said initial position from the output of said second summing means.

29. In the combination defined in claim 28 and further including third summing means, a first input to said third summing means being said second signal, a second input to said third summing means being the output of said counteracting means, whereby upon the enabling of said extraction valve position responsive means, the second signal component in the output of said second summing means is applied to and counteracts the second signal input to said third summing means, the output of said third summing means representing the first signal component of the output of said second summing means, said last named output being applied as an input to said first summing means together with said first signal, the inputs to said first summing means when said extraction valve is in a position other than said chosen position being said first signal and the pressure signal output of said third summing means.

30. In an elastic fluid multi-stage turbine which includes a rotatably mounted output shaft, an inlet valve governing the flow of elastic fluid to the turbine, an extraction valve governing the flow of elastic fluid from an intermediate stage to a succeeding stage of said turbine and an extraction conduit connected to an intermediate stage of said turbine; the combination comprising transducer means responsive to the speed of said output shaft for deriving an alternating current electric signal having an amplitude proportional to said speed, means responsive to a speed which is less than a predetermined speed for providing a source of electrical power to said combination and for causing a switching from said source to the output of said transducer means as a power source upon the attaining of a speed at least equal to said predetermined speed, means responsive to the output of said transducer means for producing a first unidirectional potential signal proportional to a prescribed speed and change from such prescribed speed, means responsive to the pressure in said extraction conduit for generating a second electric signal which is a function of said pressure, means for modifying said first signal with said second signal, means for modifying said second signal with said first signal, the modified first signal controlling the position of said inlet valve, the modified second signal controlling the position of the extraction valve, means enabled in response to a selected position of said extraction valve, means responsive to the enabling of the extraction valve position responsive means for counteracting the modification of said first signal with said second signal and for further modifying said first signal with said first signal whereby during the enabling of said extraction valve position responsive means, the position of said inlet valve is controlled by said first signal as modified by said first signal, first correction means responsive to the amount of movement of said inlet valve from a chosen position and to said modified first signal for controlling the position of said inlet valve substantially independent of the strength and non-linearities of reaction forces on said inlet valve, and second correction means responsive to the degree of movement of said extraction valve from a chosen position and to said modified second signal for controlling the position of said extraction valve substantially independent of the strength and non-linearities of reaction forces on said extraction valve.

31. In the combination defined in claim 30 wherein said switching means includes a relay which is in the energized state when said speed is less than said predetermined speed to switch said power source into circuit with said combination, said relay being deenergized upon the attaining at least of said predetermined speed to switch said combination from said power source to the output of said transducer means.

32. In the combination defined in claim 31 wherein said shaft has a variable load thereon and wherein there is further included in said means responsive to the output of said transducer means, means for preventing a jump in the position of the inlet valve in response to the switching from said power source to the output of said transducer means when there is no load on said turbine.

References Cited in the file of this patent

UNITED STATES PATENTS

| | | |
|---|---|---|
| 2,520,568 | Sederquist | Aug. 29, 1950 |
| 2,523,078 | Wales | Sept. 19, 1950 |
| 2,813,400 | Baker | Nov. 19, 1957 |
| 2,977,768 | Wagner et al. | Apr. 4, 1961 |